(12) United States Patent
Pettus et al.

(10) Patent No.: US 11,689,298 B1
(45) Date of Patent: Jun. 27, 2023

(54) METHODS OF ALIGNING AN ARTICULATED ANTENNA DEVICE

(71) Applicant: Vubiq Networks, Inc., Irvine, CA (US)

(72) Inventors: Michael Gregory Pettus, San Juan Capistrano, CA (US); Gabriel Corbett, Austin, TX (US); Andrew Pettus, San Antonio, TX (US)

(73) Assignee: Vubiq Networks, Inc., Irvine, CA (US)

( * ) Notice: Subject to any disclaimer, the term of this patent is extended or adjusted under 35 U.S.C. 154(b) by 0 days.

(21) Appl. No.: 17/937,295

(22) Filed: Sep. 30, 2022

Related U.S. Application Data

(60) Provisional application No. 63/368,107, filed on Jul. 11, 2022.

(51) Int. Cl.
*H04B 17/11* (2015.01)
*H01Q 3/08* (2006.01)
*H04B 17/336* (2015.01)

(52) U.S. Cl.
CPC .............. *H04B 17/11* (2015.01); *H01Q 3/08* (2013.01); *H04B 17/336* (2015.01)

(58) Field of Classification Search
CPC ......... H04B 17/11; H04B 17/336; H01Q 3/08
See application file for complete search history.

(56) References Cited

U.S. PATENT DOCUMENTS

| | | | |
|---|---|---|---|
| 4,696,053 A | 9/1987 | Mastriani et al. | |
| 7,501,982 B2 | 3/2009 | Charash et al. | |
| 10,396,426 B2 | 8/2019 | Michaelis et al. | |
| 10,615,484 B2 | 4/2020 | Elford et al. | |
| 10,847,865 B2 | 11/2020 | Lee et al. | |
| 2010/0188304 A1* | 7/2010 | Clymer | H01Q 19/062 343/756 |
| 2013/0321225 A1 | 12/2013 | Pettus | |
| 2013/0335264 A1* | 12/2013 | Revol | G01S 19/42 342/357.25 |

(Continued)

OTHER PUBLICATIONS

Broadband Antenna Tracking Systems, ONPOINT HDX, Product Overview (2019).

(Continued)

*Primary Examiner* — Harry H Kim
(74) *Attorney, Agent, or Firm* — Bond Schoeneck & King, PLLC; Bryan C. Smith

(57) ABSTRACT

A method for aligning an antenna device to a peer antenna device is disclosed. The method includes receiving, by an alignment management computing device, first geolocation data and a first orientation data for the antenna device. A second set of geolocation data for the peer antenna device is received. A static vector is determined for aligning the antenna device to the peer antenna device based on the first geolocation data, the first orientation data, and the second geolocation data. A first set of instructions is provided for adjusting the position of the antenna device based on the static vector to align the antenna device to the peer antenna device. An articulated antenna device configured to operate in accordance with the method is also disclosed. An antenna alignment management computing device and a non-transitory computer readable medium for performing the alignment method are also disclosed.

21 Claims, 17 Drawing Sheets

(56) References Cited

U.S. PATENT DOCUMENTS

| | | | |
|---|---|---|---|
| 2015/0092824 A1* | 4/2015 | Wicker, Jr. | H04L 25/0204 |
| | | | 375/224 |
| 2016/0149301 A1* | 5/2016 | Behroozi | H01Q 1/28 |
| | | | 342/359 |
| 2018/0233819 A1* | 8/2018 | Royalty | H01Q 3/32 |
| 2019/0013566 A1* | 1/2019 | Merrell | H01Q 1/1257 |
| 2021/0089055 A1* | 3/2021 | Tran | B64C 27/20 |

OTHER PUBLICATIONS

Broadband Antenna Tracking Systems, ONPOINT, Product Overview (2019).
Broadband Antenna Tracking Systems, ONPOINT L, Product Overview (2019).
Nextmove Technologies, LinkAlign-60EBP, Product Overview (2019).
Nextmove Technologies, E Band Positioners for Cellular Backhual Deployment, Presentation (2019).
Oldoni et al., "A Steering Antenna for Long-Reach mmWave X-Haul Links," Microwave Journal, 1-6 (2022).

* cited by examiner

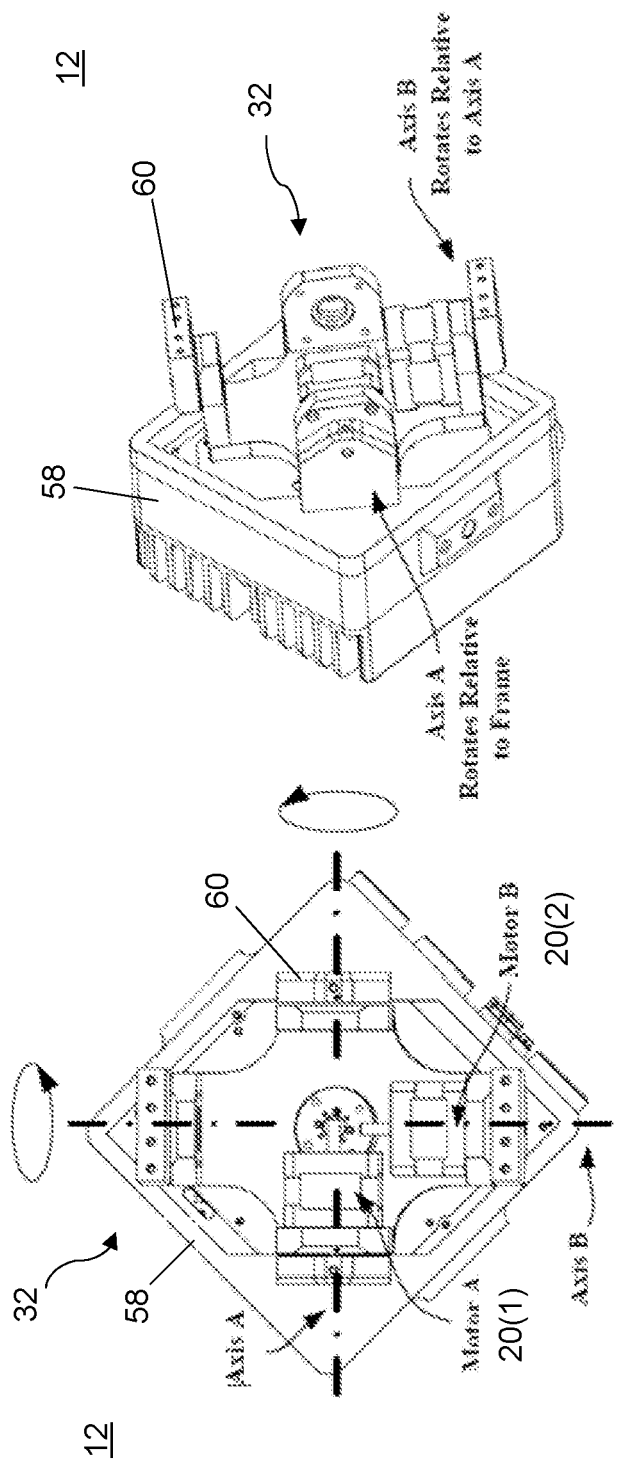

| Symbol | Name | Unit |
|---|---|---|
| $F_{LAT}$ | Local Frame Latitude | (°) |
| $F_{\varphi 1}$ | Local Frame Latitude | (rad) |
| $FP_{LAT}$ | Peer Frame Latitude | (°) |
| $F_{\varphi 2}$ | Peer Frame Latitude | (rad) |
| $F_{LON}$ | Local Frame Longitude | (°) |
| $F_{\lambda 1}$ | Local Frame Longitude | (rad) |
| $FP_{LON}$ | Peer Frame Longitude | (°) |
| $F_{\lambda 2}$ | Peer Frame Longitude | (rad) |
| $F_{EL}$ | Local Frame Elevation | (m) |
| $FP_{EL}$ | Peer Frame Elevation | (m) |
| $\Delta\psi$ | Latitude Difference | (rad) |
| $\Delta\lambda$ | Longitude Difference | (rad) |
| $\theta_{rad}$ | Bearing Angle | (rad) |
| $\theta_{deg}$ | Bearing Angle | (°) |
| $\theta_{compass}$ | Compass Bearing | (°) |
| d | Link Distance | (m) |
| $\beta_{rad}$ | Tilt Angle | (rad) |
| $\beta_{deg}$ | Tilt Angle | (°) |
| R | Earth Radius, 6371 | km |
| $(\theta_{compass}, \beta_{TILT}, d)$ | Static Vector | (°,°,km) |

FIG. 13 -cntd-

… (1)

METHODS OF ALIGNING AN ARTICULATED ANTENNA DEVICE

REFERENCE TO RELATED APPLICATIONS

This application claims priority to U.S. Provisional Patent Application Ser. No. 63/368,107, filed on Jul. 11, 2022, and entitled "METHODS OF ALIGNING AN ARTICULATED ANTENNA DEVICE" the entirety of which is incorporated herein by reference.

FIELD

This technology relates to an articulated antenna device and methods for aligning the articulated antenna device to a peer antenna device. An antenna alignment management computing device and a non-transitory computer readable medium for performing the alignment method are also disclosed.

BACKGROUND

Millimeter wave (mmWave) point-to-point radio communications links are composed of a pair of radio terminals with directional antennas. One of the major applications for this type of link is to provide wireless high-bandwidth network connectivity for cellular networks as an alternative to fiber optic cables. Physical installation barriers, circuitous routing requirements, high cost of installation, and permission grant delays all impede timely fiber-based network construction.

Point-to-point mmWave links provide a cost-effective alternative to fiber for cellular backhaul, mid-haul and front-haul (generically known as "X-haul") applications, as well as for enterprise and campus network connectivity. The directional antennas used in point-to-point links exhibit radiation patterns that are very narrow to achieve high directivity gain for longer distance ranges and to avoid interference. The mmWave antenna main lobe beamwidth, defined at the radiated half-power beamwidth (HPBW) points, is typically between 0.5° and 2° dependent on antenna aperture size. The antennas must be oriented such that the main lobes of the narrow beam patterns, also known as the antenna boresights, are precisely aligned and pointed to each other. Precise alignment must be facilitated at the time of installation, and the alignment must be maintained throughout the operational life of the link to provide reliable wireless communications.

Currently, high directivity link installation requires mechanical alignment in both the azimuth and elevation axes. Alignment with the necessary precision requires visual tools such as optical spotting scopes with the aid of electrical metering of the received signal strength indication (RSSI) signal to manually algin the terminals at each end of the link. Often the alignment must be repeated, iterating to the best position, and then mechanically secured by tightening the azimuth and elevation fasteners at the terminal mounting brackets. The alignment task required during the installation takes significant time and must be done at each end of the link by qualified personnel.

Existing millimeter wave and microwave link technology is designed to be mounted on a tower, pole or building site with the requirement that the radio and/or its antenna be precisely pointed to the other end of the link. Each end of the radio link employs highly directional antennas with beamwidths decreasing down to less than one degree in order to achieve the required range and to reduce interference with other links in the same area. The installation personnel are required to adjust and point the radio using either signal strength indication and/or optical pointing methods such as the use of accessory high-powered sighting scopes. The personnel must be trained for this kind of precision installation and the use of specialized equipment and installation tools.

Note that use of various tools may be required to loosen, adjust, sight, and then tighten each axis of an azimuth/elevation type mounting bracket for the terminal installation. The sighting scope is typically installed on the terminal and then removed once the terminal is aligned. Also, if the building, pole or tower on which the terminal is mounted moves due to vibration, swaying or other factors, either dynamically or permanently, the positioning will not hold, and the link will go off the air requiring realignment. The dynamic stability of the alignment can be affected if the platform, pole, or tower on which the terminal is installed undergoes mechanical vibration, wind induced movement, or sway. If the movement due to vibration or sway is great enough in magnitude, the terminal's narrow antenna pattern will move such that misalignment occurs, creating impaired signal integrity and/or complete loss of signal between the terminals that make up the link. More importantly from an economic perspective, this type of link failure requires a revisit by installation personnel, known in the industry as a "truck roll" and results in undesirable additional costs.

The current trend in mmWave radio terminal design is to use smaller antennas in order to meet the needs of shorter street-level backhaul links installed at locations in urban city areas with minimal impact on the visual environment. There is a desire to have radio enclosures designed as small as possible and may have the antenna built into the enclosure itself as a single integrated outdoor unit (ODU) package with a small "footprint" to meet the needs of urban deployment. Small equipment enclosures that are used in these types of urban, city and town environments are commonly described by the collective term of "street furniture", implying the design is intended to blend in with other objects installed along streets and roads with matching aesthetic and functional aspects.

There are some wireless systems that have been developed to automatically align and compensate for sway movement whereby the entire radio terminal enclosure and large antenna is moved relative to a stationary platform. This approach requires sizeable motion control hardware in the form of large motors and movable assemblies because of the mass and size of a typical radio terminal with a large antenna. The size, cost, and installation requirement for this larger type of system is significant.

This technology is directed to overcoming these and other deficiencies in the prior art.

SUMMARY

One aspect of the technology relates to a method for aligning an antenna device to a peer antenna device. The method includes receiving, by an alignment management computing device, first geolocation data and a first orientation data for the antenna device. A second set of geolocation data for the peer antenna device is received. A static vector is determined for aligning the antenna device to the peer antenna device based on the first geolocation data, the first orientation data, and the second geolocation data. A first set of instructions is provided for adjusting the position of the antenna device based on the static vector to align the antenna device to the peer antenna device. An antenna alignment management computing device and a non-transitory computer readable medium for performing the alignment method are also disclosed.

Another aspect of the technology relates to an articulated antenna device. The articulated antenna device includes a gimbal. An antenna is coupled to the gimbal. A transceiver device is located in a frame and is coupled to the antenna by a flexible waveguide. One or more motors are coupled to the gimbal and are configured to rotate the gimbal in at least two axes to adjust a bearing angle and a tilt angle of the antenna coupled to the gimbal. An alignment management computing device is coupled to the one or more motors and configured to provide one or more instructions to the one or more motors to rotate the gimbal adjust the bearing angle and/or the tilt angle of the antenna.

This technology provides a number of advantages including providing an artificial intelligence (AI) driven, compact form-factor, articulated antenna device and a method of alignment therefore that allows efficient automatic antenna alignment during installation of the articulated antenna device for use as mmWave terminal to a peer terminal. The technology also advantageously automatically maintains that alignment after installation by adjusting for dynamic movement of the articulated antenna device based on movement of the structure on which the device is mounted.

BRIEF DESCRIPTION OF THE DRAWINGS

FIGS. 5A and 5B are top and side perspective views of the exemplary articulated antenna device with the antenna removed from the gimbal.

DETAILED DESCRIPTION

This technology relates to an articulated antenna device and methods for aligning the articulated antenna device to a peer antenna device. An antenna alignment management computing device and a non-transitory computer readable medium for performing the alignment method are also disclosed.

One aspect of the technology relates to an articulated antenna device. The articulated antenna device includes a gimbal. An antenna is coupled to the gimbal. A transceiver device is located in a frame and is coupled to the antenna by a flexible waveguide. One or more motors are coupled to the gimbal and are configured to rotate the gimbal in at least two axes to adjust a bearing angle and a tilt angle of the antenna coupled to the gimbal. An alignment management computing device is coupled to the one or more motors and configured to provide one or more instructions to the one or more motors to rotate the gimbal adjust the bearing angle and/or the tilt angle of the antenna.

Figure 1:
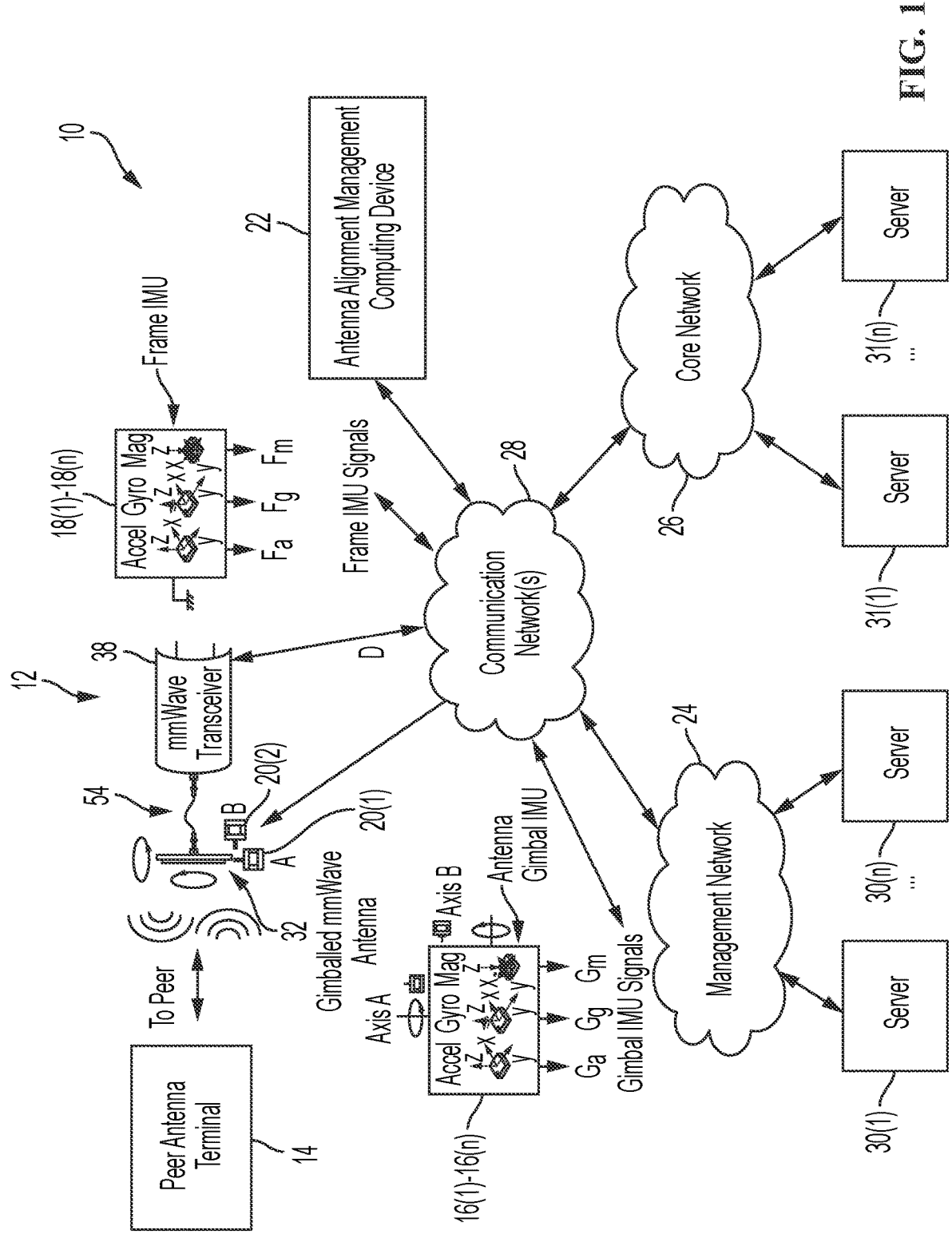
FIG. 1 illustrates an environment including an exemplary articulated antenna device of this technology.

An environment 10 including an exemplary articulated antenna device 12 including a gimballed antenna device 32 coupled to a mmWave transceiver device 38 by a flexible waveguide 54 is illustrated in FIG. 1. The environment 10 further incorporates a peer antenna terminal 14, gimbal inertial measuring units 16(1)-16(n), frame inertial measuring units 18(1)-18(n), a pair of motors 20(1) and 20(2), an antenna alignment management computing device 22, a management network 24, and a core network 26 coupled by one or more communication network(s) 28, although the environment 10 may include additional numbers and/or types of devices in other configurations. For example, the environment 10 may include a plurality of servers 30(1)-30(n) coupled to the management network 24 and plurality of servers 31(1)-31(n) coupled to the core network 26. The environment 10 may also include time-of-flight (TOF) sensors (not shown) as described in further detail below.

Figure 2:
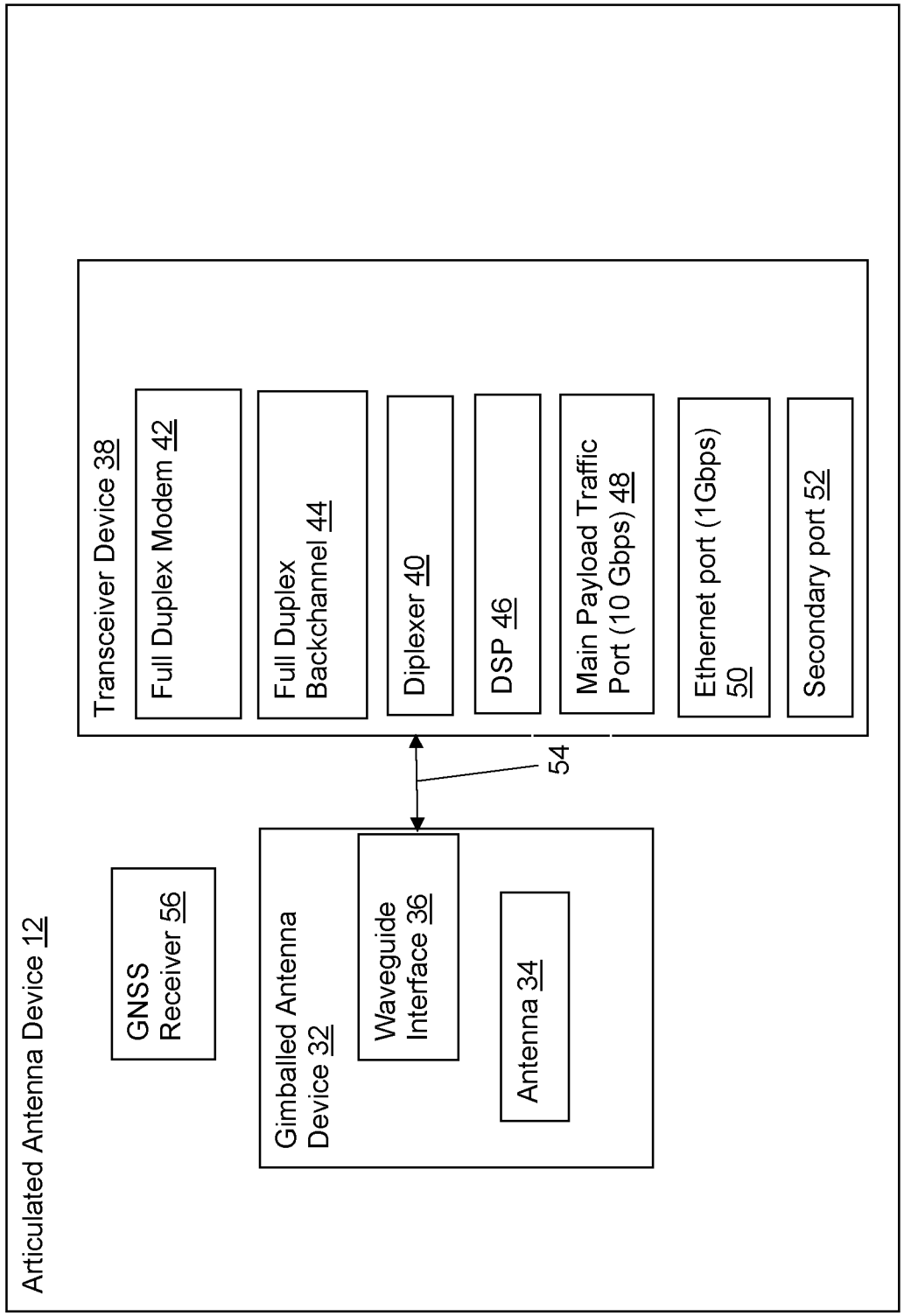
FIG. 2 illustrates a block diagram of an exemplary articulated antenna device.

FIG. 2 is a block diagram of the articulated antenna device 12 shown in FIG. 1. In one example, articulated antenna device 12 serves as a millimeter wave terminal that is configured to communicate with one or more peer terminals, including peer antenna terminal 14. For example, the articulated antenna device 12 can be employed as a point-to-point link with an identical device at a peer location. The articulated antenna device 12 includes a gimballed antenna device 32 having an antenna 34 and a waveguide interface 36. The gimballed antenna device 32 is coupled to a transceiver device 38, having a transmitter and receiver, configured for transmitting and receiving millimeter wave radiofrequency, respectively, through the antenna 34. The transceiver device 38 includes, for example, a diplexer 40, a full duplex modem 42, and a full duplex backchannel 44, although the transceiver device 38 may include other additional elements such as a digital signal processor 48, for example. The articulated antenna device 12 is configured to form a full duplex link with the peer antenna terminal 14 (as shown in FIG. 1). The frequencies of operation for transmit and receive are inverted between the articulated antenna device 12 and the peer antenna terminal 14 allowing frequency division duplex communications. The articulated antenna device 12 can also include a GNSS receiver 56 for determining geolocation data for the articulated antenna device 12 for use in the methods disclosed herein.

In this example, the modem 42 is a full duplex device designed for simultaneous transmission and reception of main link wireless payload traffic. In one example, the modem 42 is a high-speed full duplex modem capable of carrying the main link wireless payload traffic at data rates of up to 10 Gbps, although it is anticipated that as the transceiver device and modem technology evolve, higher data rates of up to 50 Gbps will be incorporated. In one example, the full duplex modem 42 is configured to provide a received signal strength indicator (RSSI) data value and a signal-to-noise ratio (SNR) data value for the antenna 34 of the articulated antenna device 12, received from the receiver of the transceiver device 38, to the antenna alignment management computing device 22. In one example, the RSSI data value and the SNR data values are provided based on API calls to the full duplex modem 42. In this example, the diplexer 40 is a frequency filter type diplexer enabling simultaneous radiofrequency transmission and reception at a common antenna port by using a different transmit and receive frequency that forms the basis for frequency division duplex (FDD). In this example, the full duplex backchannel 44 may be utilized in backchannel device communication to transmit and/or receive radio signals from various other radio transceivers, including by way of example, the peer antenna terminal 14. The full duplex backchannel 44 provides a lower speed for carrying control and management information between local and peer terminals.

The transceiver device 38 also includes various physical and wireless data ports for interconnecting, for example, to the management network 24 and the core network 26 (as shown in FIG. 1). Although exemplary ports are illustrated and described, the transceiver device 38 could have other types and/or numbers of ports in other combinations. By way of example, the transceiver device 38 may interconnect to the core network 26 for the main payload traffic and to the management network 24 for configuration, control, and monitoring. In one example, the main payload traffic port 48 is an Ethernet port that supports the SFP+ standard at 10 Gbps. The management data is connected via an Ethernet port 50 that supports the SFP standard at 1 Gbps, along with a secondary port 52 that is connected via an LTE wireless modem for monitoring and control in case the SFP Ethernet port 50 connection is not used.

The gimballed antenna device 32 is coupled to the transceiver device 38 through the waveguide interface 36 using a flexible waveguide 54. In this example, articulated antenna device 12 also includes a GNSS receiver 56 configured to determine the GNSS coordinates of the articulated antenna device. Any suitable GNSS receiver device may be employed. In this example, the GNSS receiver 56 provides the latitude, longitude, and altitude location information, known as the geolocation, of the articulated antenna device 12, which provides one end of the link between the articulated antenna device 12 (local terminal) and the peer antenna terminal 14.

Figure 3:
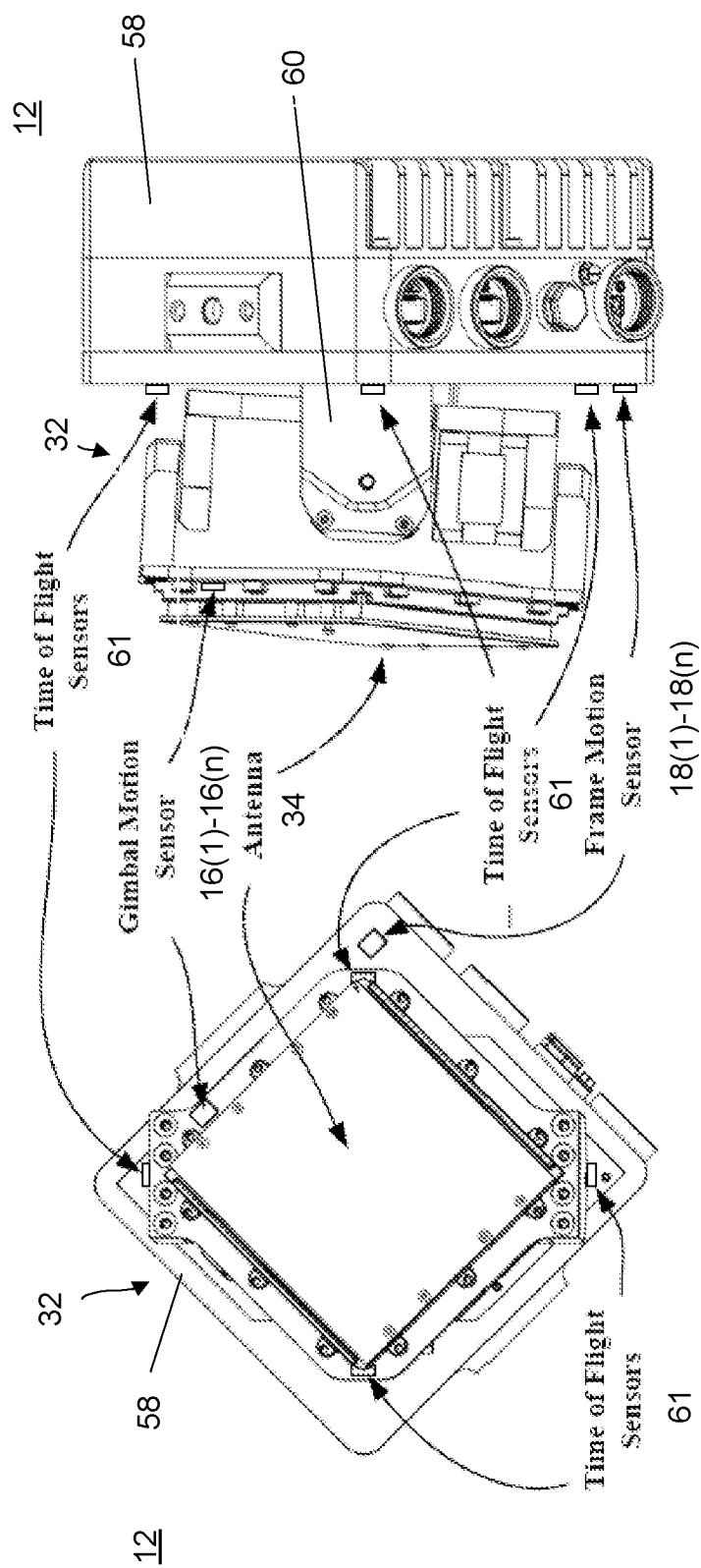
FIGS. 3A and 3B are top and side views of the exemplary articulated antenna device including a gimballed antenna device coupled to a frame housing a transceiver device.

FIGS. 3A and 3B illustrate top and side views, respectively, of the articulated antenna device 12 with the gimballed antenna device 32 coupled to a frame 58. Gimballed antenna device 32 includes the antenna 34 coupled to a gimbal 60. In this example, the antenna 34 is a flat panel antenna, although in other examples the technology of this disclosure can be employed with a parabolic antenna as described below. The gimbal 60 supports the flat panel mmWave antenna 34 such that the antenna 34 can be positioned at various angles as described in detail below. Although example antennas are described, the technology of this disclosure can be employed with any directional antenna. The gimbal 60 is coupled to the frame 58 such that the flexible waveguide 54 can electrically couple the antenna 34 to the transceiver device 38 located in the frame 58 (as shown for example in FIGS. 2 and 4) while allowing the gimbal 60 to rotate in at least two axes to adjust a bearing angle and a tilt angle of the antenna 34, as described in further detail below. In this example, the articulated antenna device 12 also includes a number of time-of-flight (TOF) sensors 61 coupled to the frame 58. The TOF sensors 61 can be used either alone, or in conjunction with the gimbal and frame motion sensors 16(1)-16(n) and 18(1)-18(n), respectively, to determine changes in the position of the antenna 34 as described in further detail below.

In order to articulate the mmWave antenna 34 independently from the stationary portion of the articulated antenna device 12 (the transceiver device 38 located in the frame 58) a flexible interconnection is required. While the flexible connection could be implemented using a coaxial cable and connectors, the required frequency response in the mmWave ranges would require extremely precise coaxial cable construction with accompanying high-precision coaxial connectors. Due to the nature of coaxial cable construction, typical cable electrical signal losses at mmWave frequencies are prohibitive for efficient operation. Precision coaxial cable and precision cable connectors designed to operate at mmWave frequencies are also very costly.

In order to reduce signal loss, mmWave radio design typically implements signal connection between the radio frequency components such as the transmitter, receiver, diplexer, and antenna using a rigid air dielectric waveguide. Short waveguide sections and waveguide mechanical interfaces provide low signal loss at a reasonable cost. However, a rigid waveguide provides no mechanical flexibility for interconnecting a mechanically articulated antenna with a stationary radio assembly. In order to provide an efficient low signal loss connection at a low cost, a recent innovation in waveguide technology has been produced whereby the material construction of the waveguide allows flexible mechanical interconnection, similar to flexible cable, but with the losses similar to rigid waveguide performance.

Figure 4:
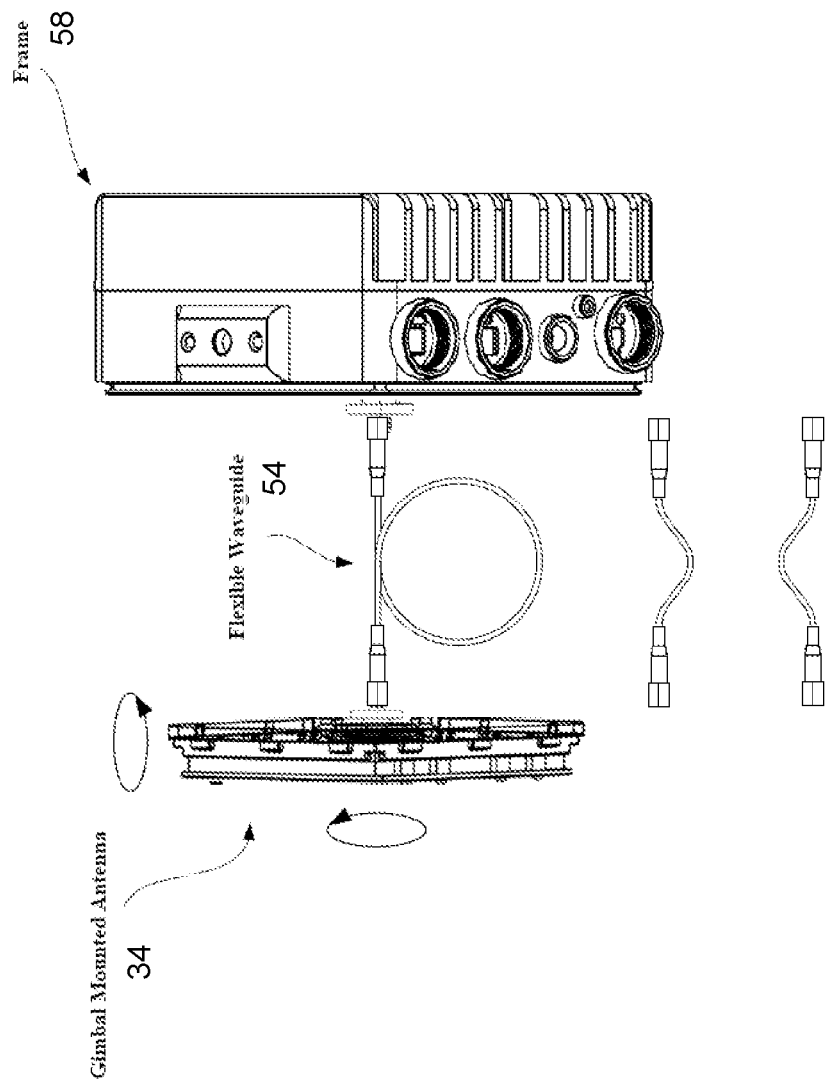
FIG. 4 illustrates an exploded view of an articulated antenna device of this technology with the gimbal removed to illustrate the connection between the antenna of the gimballed antenna device and the transceiver located in the frame through a flexible waveguide.

Accordingly, as shown in FIGS. 1, 2, and 4, for example, the flexible waveguide 54 in this example is produced by Samtec (New Albany, Ind.) and is available in both V-band (50 to 75 GHz) and E-band (60 to 90 GHz) frequency ranges, with anticipated future product to be available for W-band (75 to 110 GHz). The flexible waveguide 54 interconnects the transmit and receive mmWave electromagnetic signals through a connection from the diplexer 40 in the transceiver device 38 to the articulated antenna 34. The antenna 34 can then be moved in two separate axes independently of the fixed radio assembly incorporated in the frame 58.

FIG. 4 illustrates the antenna 34 coupled to the transceiver device 38 (shown in FIG. 2) located in the frame 58 by the flexible waveguide 54 (other elements are removed to illustrate the connection). The flexible waveguide 54 is connected at one end to the diplexer 40 of the transceiver device 38 (FIG. 2) and at the other end to the antenna 34 (through the waveguide interface 36). The use of the flexible waveguide 54 allows for motion of the gimbal 60 (as shown in FIGS. 3A and 3B) to adjust the position of the antenna 34 as described in further detail below. Specifically, the antenna 34 is articulated inside an enclosure that houses both the stationary part of the articulated antenna device 12 (frame 58) and the gimballed antenna device 32. The frame 58 is configured to house the transceiver device 38 elements as described above, and is configured to be located on a structure such as a pole, rooftop, building wall, or tree, for example, although the frame 58 may be mounted in any location. The articulated antenna device 12 may be located such that the antenna 34 can be aligned to the peer antenna terminal 14 (as shown in FIG. 1) in accordance with the methods described herein.

Referring again to FIG. 2, the elements of the articulated antenna device 12, including the antenna 34 and the transceiver device 38 are designed to operate at millimeter Wave frequencies, typically from 60 GHz up through 90 GHz, but other frequency ranges are anticipated. In one example, the antenna 34 and transceiver device 38 operate in the 71-76 GHz and 81-86 GHz frequency range, also known as E-band. Two E-band frequency segments are typically used to provide frequency division duplex (FDD) using a common antenna for transmission and reception. The antenna 34 has the waveguide 36 interface for transmission and reception of mmWave electromagnetic energy.

Referring again to FIGS. 3A and 3B, in this example, the one or more frame inertial measurement units (IMUs) 18(1)-18(n) are coupled to the frame 58 and the one or more gimbal IMUs 16(1)-16(n) are coupled to the gimbal 60. The frame IMUs 18(1)-18(n) and gimbal IMUs 16(1)-16(n) are configured to obtain inertial measurements to determine positions and/or movement of the frame 58 and the gimbal 60, respectively.

In one example, the frame IMUs 18(1)-18(n) and gimbal IMUs 16(1)-16(n) each comprise a 3-axis accelerometer, a 3-axis gyroscope, and a 3-axis magnetometer (compass), although other IMU devices may be employed. In one example, the frame IMUs 18(1)-18(n) and the gimbal IMUs 16(1)-16(n) may include model ISM330DHCX (accelerometer and gyroscope) manufactured by STMicroelectronics (Geneva, Switzerland) and model LIS3MDL (magnetometer) manufactured by STMicroelectronics (Geneva, Switzerland), although other suitable devices may be employed for the frame and gimbal IMUs. As shown in FIG. 1, the frame IMUs 18(1)-18(n) and the gimbal IMUs 16(1)-16(n) are operatively coupled to the antenna alignment management computing device 22 to provide position and/or motion data regarding the frame and gimbal to the antenna alignment management computing device 22.

In another example, the frame 58 and/or the gimbal 60 have the one or more time-of-flight (TOF) sensors 61 coupled thereto and configured to measurement position and/or movement of the frame 58 and gimbal 60, as described in further detail below. For example, the TOF sensors may be VL53L4CD sensors manufactured by STMicroelectronics (Geneva, Switzerland). By way of example, the TOF sensors may be mounted on the frame 58 to receive reflected beams from a surface of the gimbal 60 that allows the TOF sensors to determine the position and/or motion of the gimbal 60 with respect to the frame 58.

FIGS. 5A and 5B are top and perspective views of the exemplary articulated antenna device 12 with the antenna 34 of the gimballed antenna device 32 removed from the gimbal 60 to illustrate the gimbal 60 more clearly. As shown in FIG. 5A, in this example, the gimballed antenna device 32 includes the pair of motors 20(1) and 20(2) configured to rotate the gimbal 60 in Axis A and Axis B, respectively. In this example, Axis A and Axis B are orthogonal to one another. In this example, the pair of motors 20(1) and 20(2) are stepper motors, although other suitable motors, such as DC servo motors or geared servo motors could be employed.

Commercially available stepper motors typically have a resolution of about 1.8-degree step size, although microstepping techniques may be employed to drive the motors in fractional portions of the 1.8-degree step size that allow selectable angular resolutions down to about 0.056 degrees. In this example, it is desirable to rotate and position the mmWave antenna 34 (as shown for example in FIGS. 3A and 3B) to within at least 10% of the half power-beamwidth (HPBW) of the flat panel antenna 34. For an example, an antenna with a beamwidth of 1.9°, the desired angular positioning resolution would be ±0.19°, well within the ability of a stepper motor driven with a micro-stepping electronic controller. The pair of motors 20(1) and 20(2) are operatively coupled to the antenna alignment management computing device 22 such that the antenna alignment management computing device 22 can provide instructions to the pair of motors 20(1) and 20(2) to alter the position of the gimbal 60 to align the antenna 34 to the peer antenna terminal 14 (as shown in FIG. 1) in accordance with the methods disclosed herein.

Figure 6B:
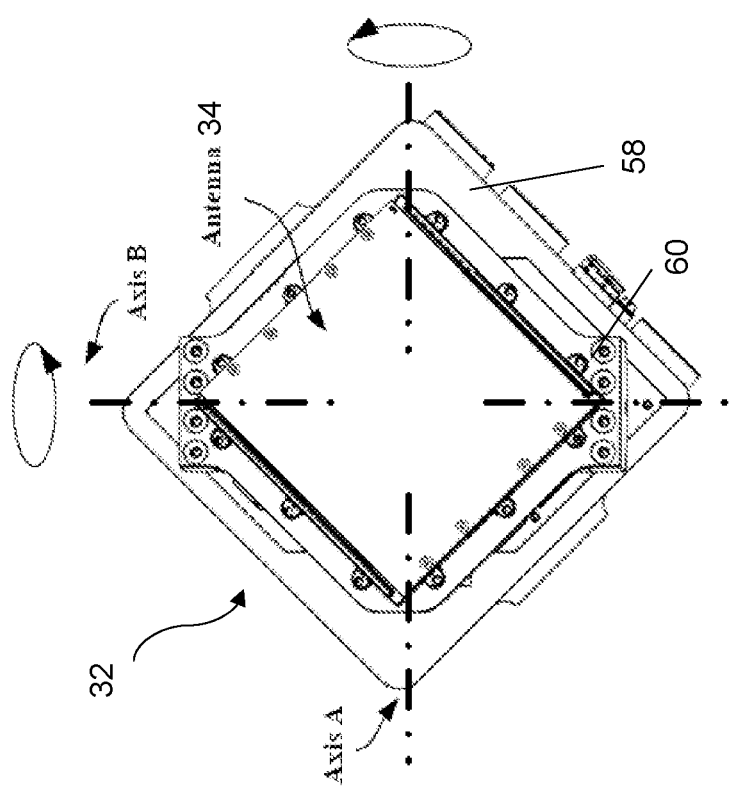
FIGS. 6A and 6B illustrate the gimballed antenna device oriented in a vertical and horizontal polarization, respectively.
Figure 6A:
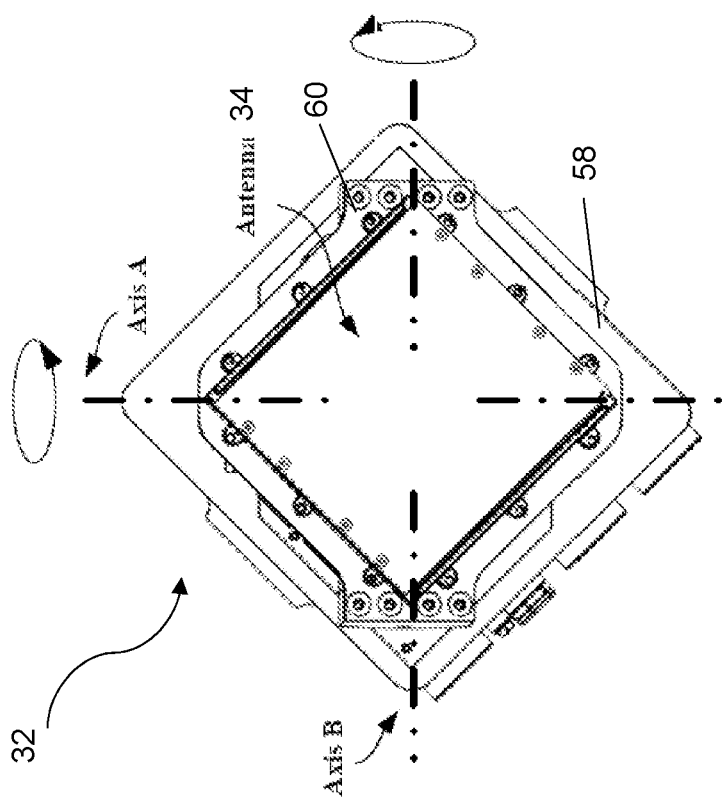

As shown in FIG. 5B, in this example, the gimbal 60 has independent rotational motion about two separate axes, i.e., Axis A relative to the frame and Axis B relative to Axis A. The rotation of the gimbal 60 about Axis A and Axis B allows for adjustment of a bearing angle and a tilt angle of the antenna 34 for alignment. FIGS. 6A and 6B illustrate that the antenna 34 may be positioned for either vertical polarization (FIG. 6A) or horizontal polarization (FIG. 6B) depending on the positioning of the frame 58. Accordingly, rotation of the gimbal 60 around Axis A or Axis B may be used to adjust the bearing or tilt angle of the antenna 34 depending on the orientation in which the antenna 34 is mounted. The resulting change in the direction of the boresight pattern of the antenna 34 facilitates automatic link alignment between the articulated antenna device 12 and the peer antenna terminal 14 (as shown in FIG. 1). The alignment is also maintained if for any reason the platform which supports the installed frame 58 of the articulated antenna device 12 moves due to environmental causes such as vibration or wind, as described in the methods detailed below.

Figures 7A, 7B:
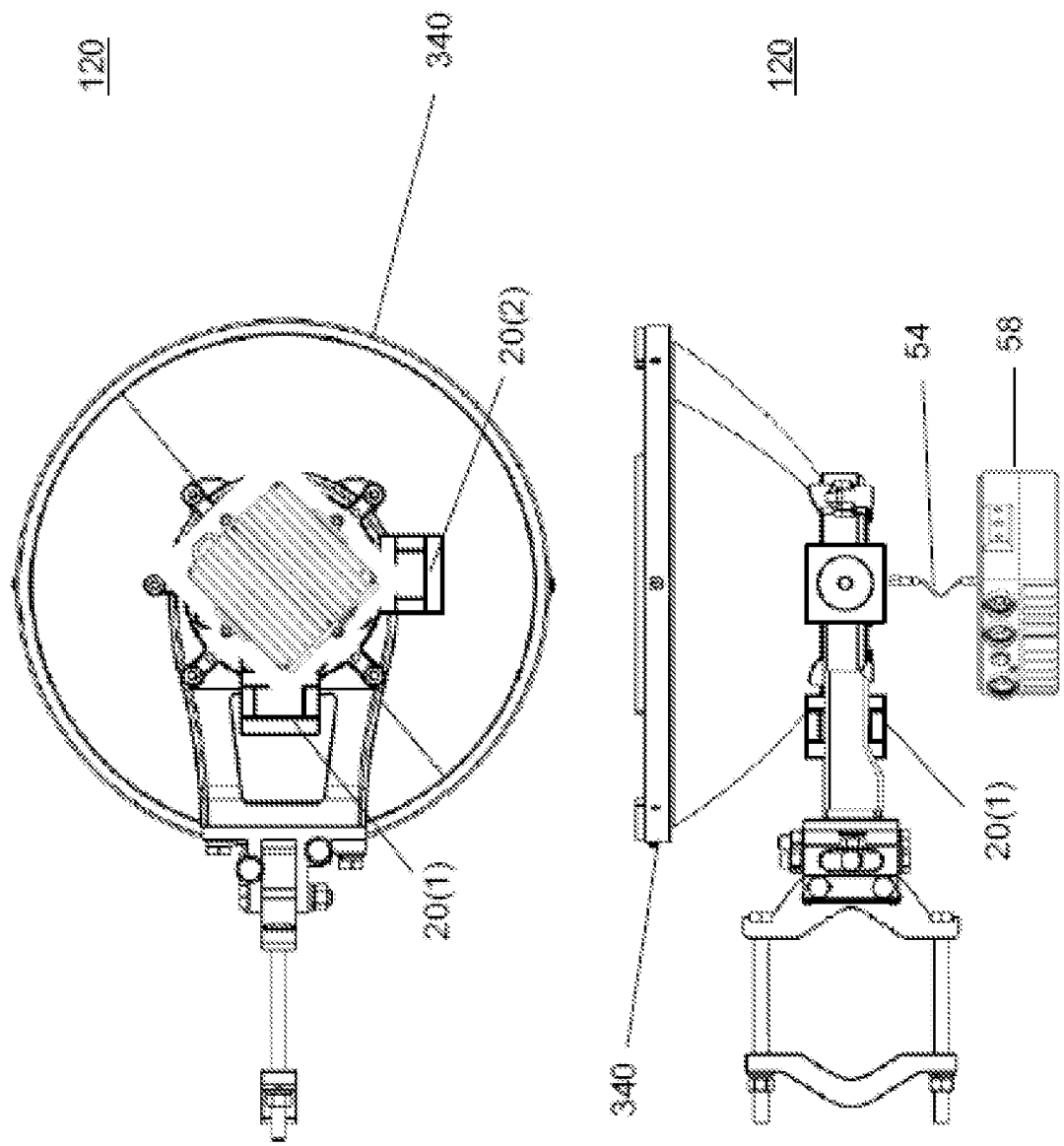
FIGS. 7A and 7B illustrate top and side views of another exemplary articulated antenna device including a parabolic antenna.

FIGS. 7A and 7B illustrate top and side views of another exemplary articulated antenna device 120 including a parabolic antenna 340. This example includes the pair of motors 20(1) and 20(2), which in this example are configured to move the parabola/feed only, not the mount and not the transceiver device 38 (located in the frame 60). Parabola antennas (without the die cast mount hardware) are fairly light and can thus be moved to align the antenna 340 in accordance with the methods disclosed herein. This approach similarly leverages the flexible waveguide 54 between the transceiver device 38 (located in frame 58) and the articulated antenna device 120 utilizing the parabolic antenna 340.

Referring again to FIG. 1, the peer antenna terminal 14 is a mmWave terminal configured to operatively communicate with the articulated antenna device 12. In one example, the peer antenna terminal 14 is a device that is identical to the articulated antenna device 12, although other peer antenna terminals without articulated antennas may also be employed. The peer antenna terminal 14 may be located in any position within communication range of the articulated antenna device 12. The peer geolocation information is either known at the time of installation, obtained from the management network 24, or can be determined from initial link alignment through the communications backchannel between the articulated antenna device 12 (local terminal) and the peer antenna terminal 14, as described in further detail below.

Figure 8:
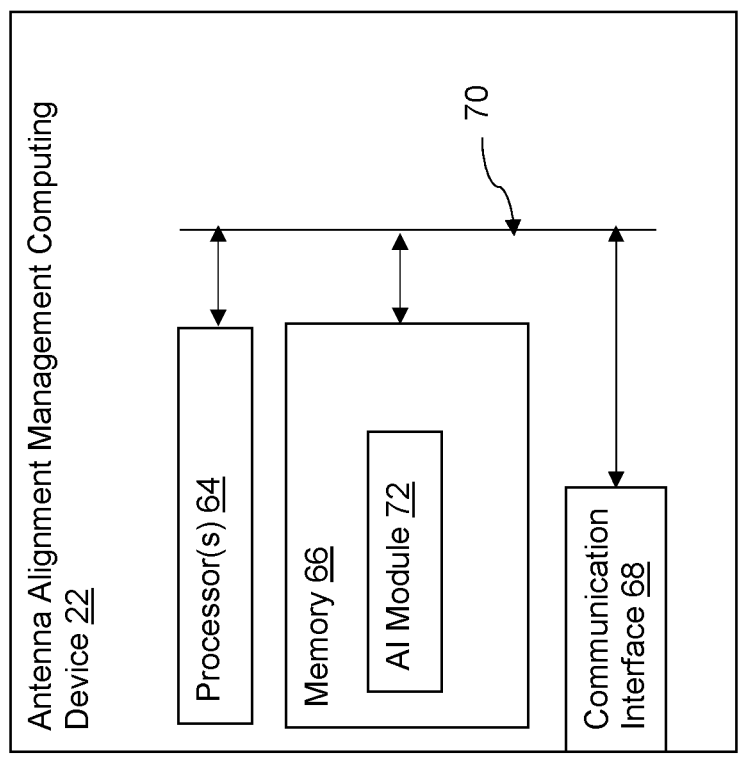
FIG. 8 is a block diagram of the exemplary antenna alignment management computing device shown in FIG. 1.
Figure 9A:
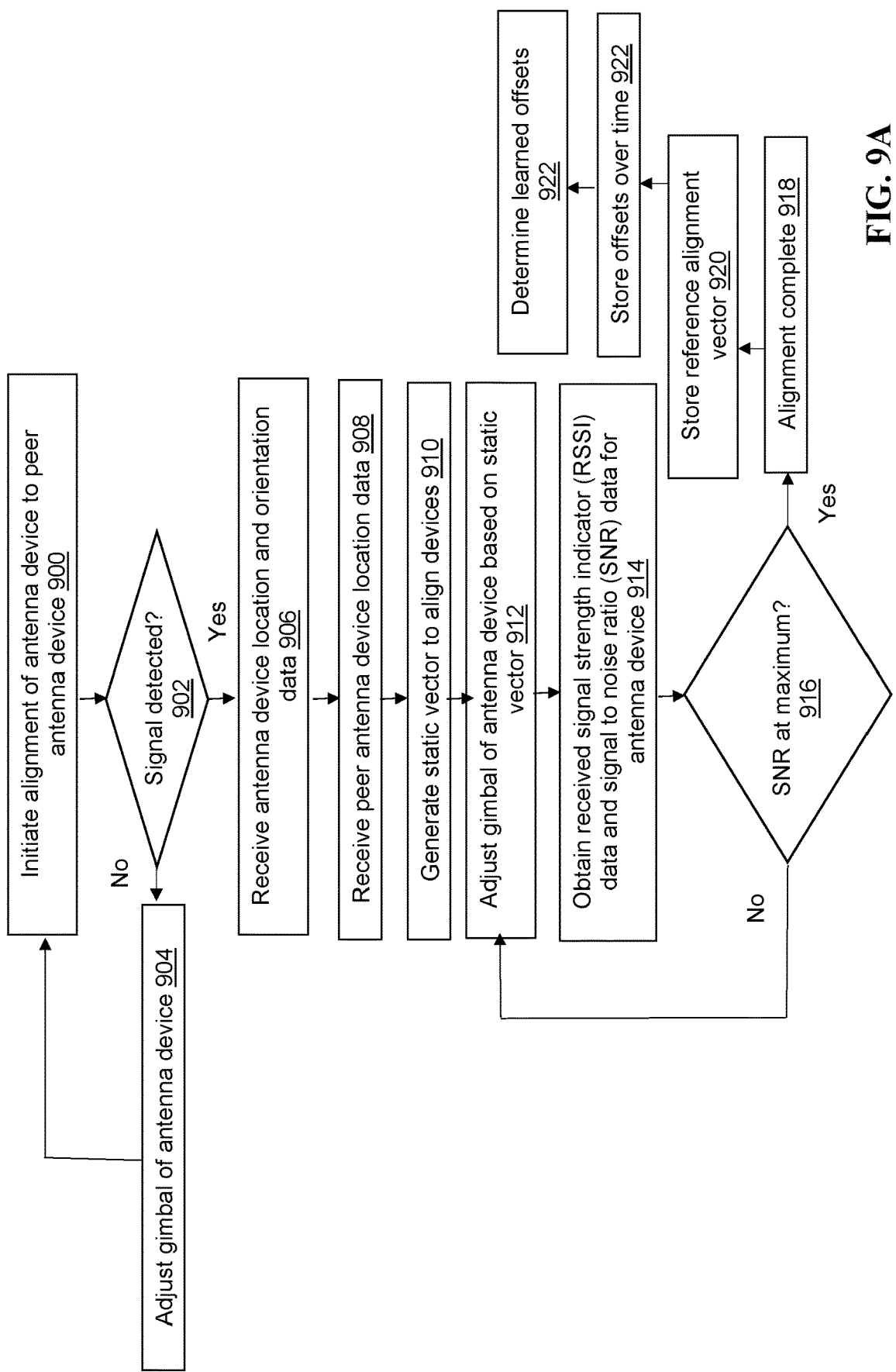
FIG. 9A is a flowchart of an exemplary method for aligning an antenna device to a peer antenna terminal.
Figure 9B:
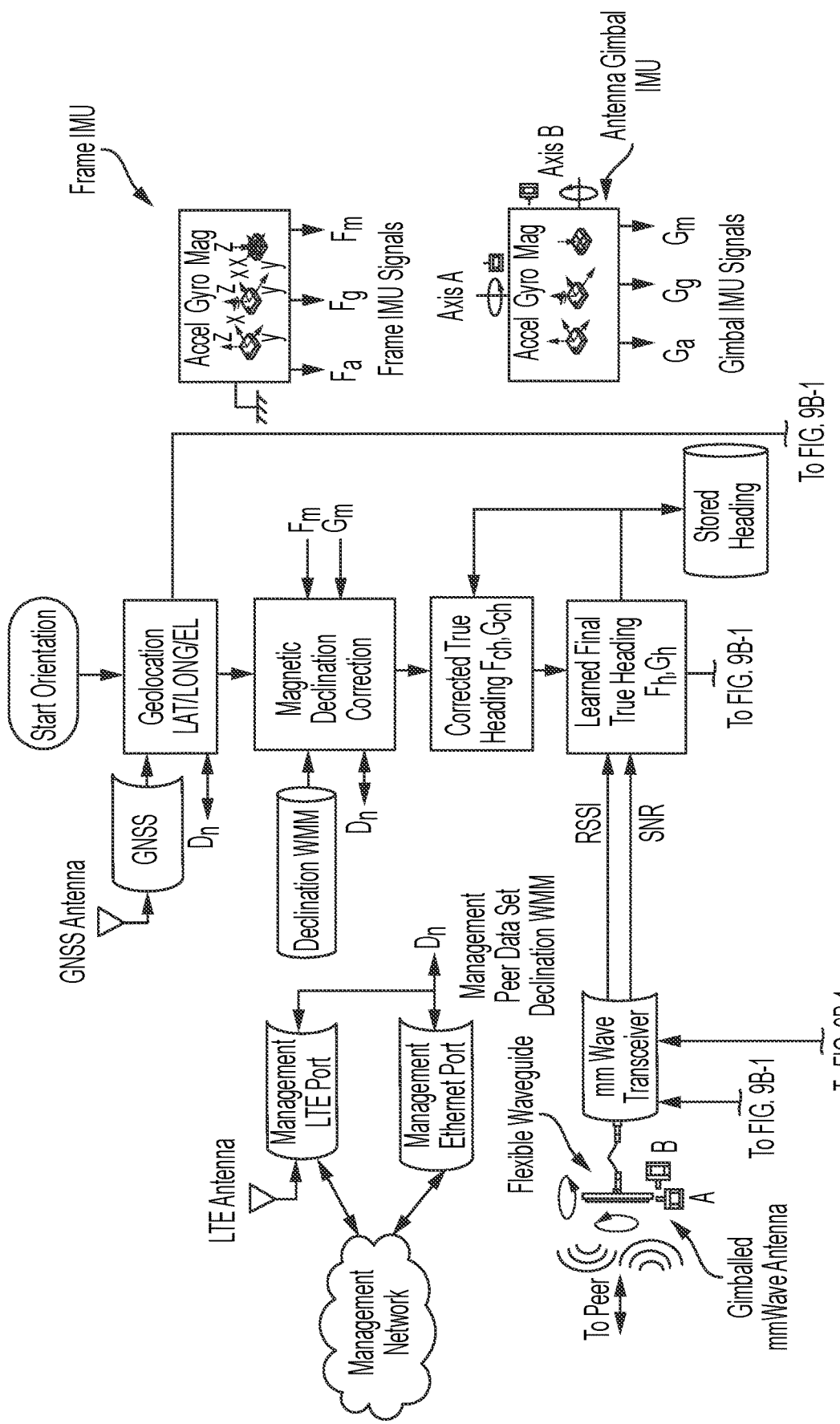
FIG. 9B is a combined flow chart and environment diagram of the exemplary method for aligning an antenna device to a peer antenna terminal.
Figures 1, 9B:
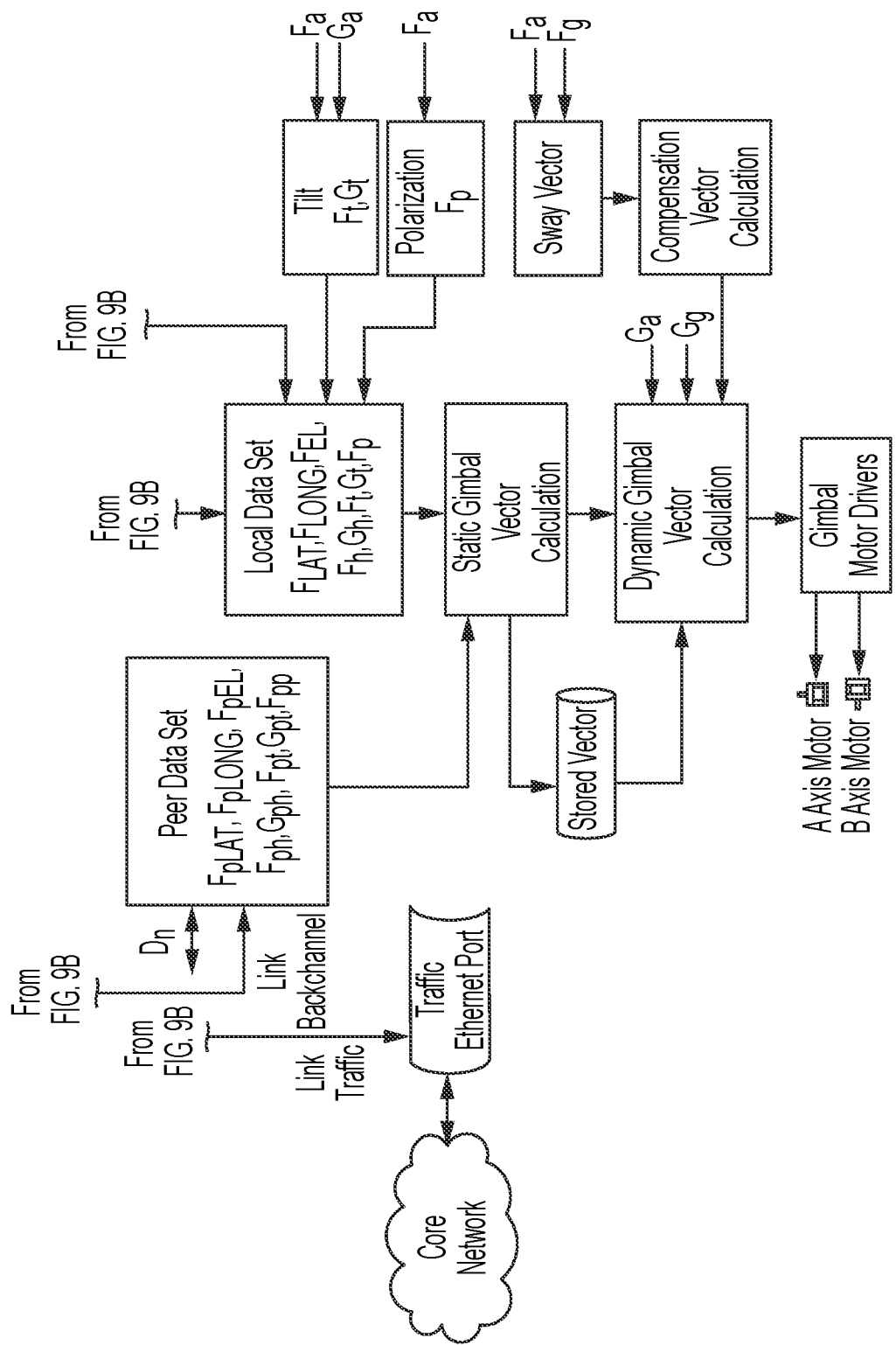

Referring now more specifically to FIGS. 1 and 8, the antenna alignment management computing device 22 in this example includes one or more processor(s) 64, a memory 66, and a communication interface 68, which are coupled together by a bus 70 or other communication link, although the antenna alignment computing device 22 can include other types and/or numbers of elements in other configurations. In one example, the antenna alignment management computing device 22 is a microcontroller that can be located in the frame 60 of the articulated antenna device 12.

The processor(s) 64 of the antenna alignment management computing device 22 may execute programmed instructions stored in the memory 66 for the any number of the functions described and illustrated herein. In one example, the processor(s) 64 provides instructions to the pair of motors 20(1) and 20(2) to rotate the gimbal 60 of the gimballed antenna device 32 to provide alignment of the antenna 34 to the peer antenna terminal 14 (for example), although the processor(s) 64 can provide other instructions to operate the articulated antenna device 12 in accordance with the methods disclosed herein. In another example, the processor(s) 64 dynamically adjust the position of the antenna 34 based on movement of the structure on which the antenna 34 is installed. The processor(s) 64 may include one or more CPUs, GPUs, or general-purpose processors with one or more processing cores, for example, although other types of processor(s) can also be used such as FPGA devices.

The memory 66 stores these programmed instructions for one or more aspects of the present technology as described and illustrated herein, although some or all of the programmed instructions could be stored elsewhere. A variety of different types of memory storage devices, such as random-access memory (RAM), read only memory (ROM), hard disk, solid state drives, flash memory, or other computer readable medium which is read from and written to by a magnetic, optical, or other reading and writing system that is coupled to the processor(s) 64, can be used for the memory 66.

Accordingly, the memory 66 of the antenna alignment management computing device 22 can store one or more applications or programs that can include computer executable instructions that, when executed by the processor(s) 64 of the antenna alignment management computing device 22, cause the antenna alignment management computing device 22 to perform actions described below. The application(s) can be implemented as modules, threads, pipes, streams, or components of other applications. Further, the application(s) can be implemented as operating system extensions, module, plugins, or the like.

In this example, the memory 66 also includes an artificial intelligence (AI) module 72 that can be used to provide any of the machine learning aspects disclosed in accordance with the methods described herein. The AI module 72 can employ different techniques like machine learning, such as a binary classifier, such as a Support Vector Machine (SVM), Logistic Regression, Random Forest, or XGBoost, for example, neural networks, deep learning, such as a convolutional neural network (CNN) or long short-term memory (LSTM), etc. to provide machine learning in accordance with certain aspects of the disclosed methods.

Even further, the application(s) may be operative in a cloud-based computing environment. The application(s) can be executed within or as virtual machine(s) or virtual server(s) that may be managed in a cloud-based computing environment. Also, the application(s) may be running in one or more virtual machines (VMs) executing on the antenna alignment management computing device 22. The communication interface 68 operatively couples and communicates between the antenna alignment management computing device 22 and the articulated antenna device 12, the pair of motors 20(1) and 20(2), the frame IMUs 18(1)-18(n), the gimbal IMUs 16(1)-16(n), the management network 24, and the core network 26, for example, as shown in FIG. 1.

In another example, the antenna alignment management computing device 22 is a highly integrated microcontroller device with a variety of on-board hardware functions, such as analog to digital converters, digital to analog converters, serial buses, general purpose I/O pins, RAM, and ROM. The microcontroller may be located for example, in the frame 58 of the articulated antenna device 12.

Although the exemplary antenna alignment management computing device 22 is described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

In addition, two or more computing systems or devices can be substituted for the antenna alignment management computing device 22. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Referring again to FIG. 1, the management network 24 may include a number of networked servers, including servers 30(1)-30(n). In one example, the alignment management computing device 22 communicates with the management network 24 via the full duplex backchannel 44 for configuration, control, and management. The core network 26 may also include a number of networked servers, including servers 31(1)-31(n). In one example, the antenna alignment management computing device 22 communicates with the core network 26 using the full duplex modem 42 for the main payload traffic data. Although the core network 26 and management network 24 are illustrated and described, it is to be understood that the antenna alignment management computing device 22 may be coupled to other types and/or numbers of devices or networks to receive data for implementing the methods disclosed herein.

Another aspect of the technology relates to a method for aligning an antenna device to a peer antenna device. The method includes receiving, by an antenna alignment management computing device, first geolocation data and a first orientation data for the antenna device. A second set of geolocation data for the peer antenna device is received. A static vector is determined for aligning the antenna device to the peer antenna device based on the first geolocation data, the first orientation data, and the second geolocation data. A first set of instructions is provided for adjusting the position of the antenna device based on the static vector to align the antenna device to the peer antenna device. An alignment management computing device and a non-transitory computer readable medium for performing the alignment method are also disclosed.

Referring now to FIGS. 1-9B, an exemplary method for aligning the articulated antenna device 12 to the peer antenna terminal 14 (as shown in FIG. 1), will be described. In step 900, the antenna alignment management computing device 22 initiates the alignment of the articulated antenna device 12 to the peer antenna terminal 14 or antenna device. The alignment may be initialized upon installation and start-up of the articulated antenna device 12. The articulated antenna device 12 can be installed to be generally aligned with the peer antenna terminal 14 (i.e., within plus or minus a few degrees). The peer antenna terminal 14 may be installed in a known location or may be capable of alignment in the same manner as the articulated antenna device 12.

In step 902, the antenna alignment management computing device 22 determines if the articulated antenna device 12 detects a signal from the peer antenna terminal 14. Generally, the manual alignment of the articulated antenna device 12 should be sufficient to allow for detection of a signal. If, in step 902, a signal is detected, the YES branch is taken and the method proceeds to the next step in the alignment process. However, in the event of user installation error, such that there is no signal detected in step 902, in step 904, the antenna alignment management computing device 22 can adjust the articulated antenna device 12 to obtain a signal.

For example, if no signal is detected in step 902, in step 904 the antenna alignment management computing device 22 can provide instructions to the pair of motors 20(1) and 20(2) to adjust the bearing and tilt angle of the antenna 34 by rotating the gimbal 60 about Axis A and Axis B as shown in FIG. 5A. For example, the antenna alignment management computing device 22 may instruct the pair of motors 20(1) and 20(2) to perform a dithering routine that provides small rotational movements of the gimbal 60 to adjust the directionality of the antenna 34. The signal may be continually checked during the dithering routine in order to determine if a viable signal is obtained.

Referring again to FIGS. 9A and 9B once a signal is obtained the antenna alignment management computing device 22 proceeds, in step 906, to receive geolocation data and orientation data for the articulated antenna device 12. In one example, the geolocation data for the articulated antenna device 12 is received from the GNSS receiver 56 associated with the articulated antenna device 12. The geolocation data for the articulated antenna device 12 includes a latitude ($F_{LAT}$), a longitude ($F_{LON}$), and an elevation ($F_{EL}$) associated with the frame of the articulated antenna device. In one example, the geolocation data is obtained from the GNSS receiver 56 associated with the articulated antenna device 12. In another example, the geolocation data is obtained from the management network 24 based on known geolocation data for the location of the installation of the articulated antenna device 12.

Figure 10:
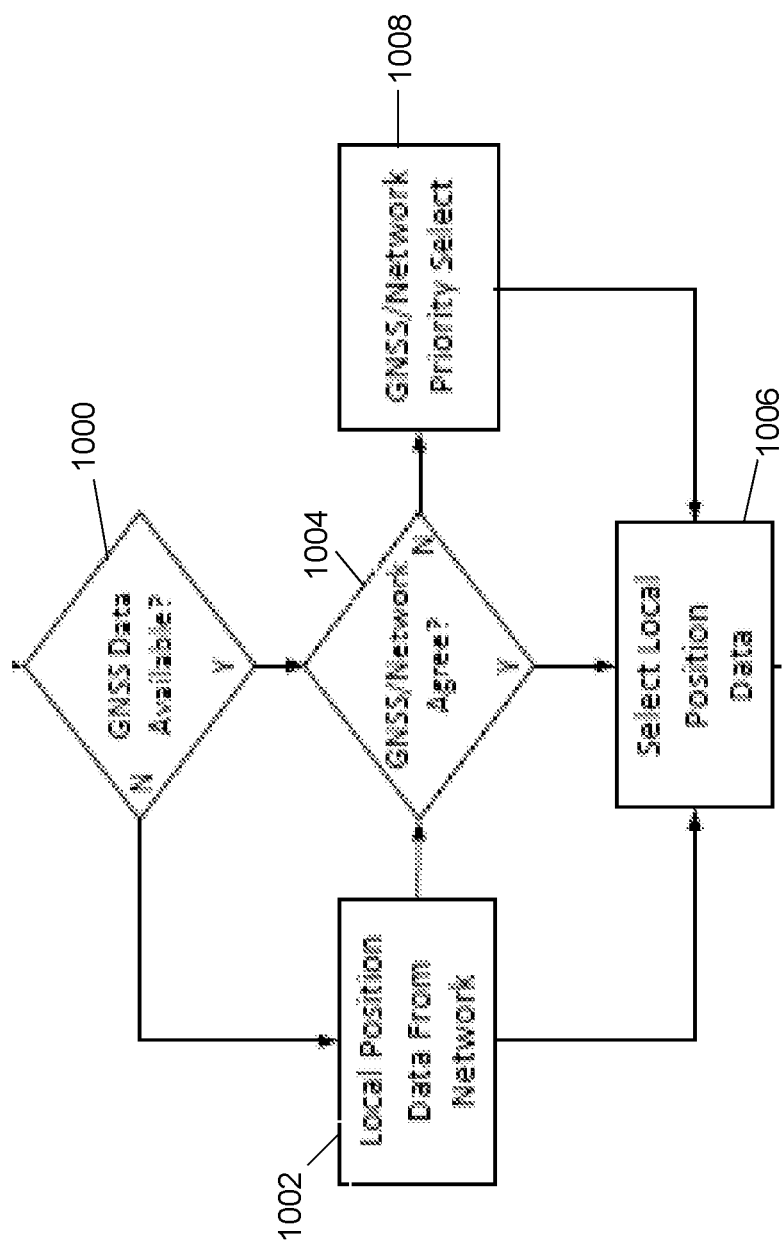
FIG. 10 is a flowchart for an optional method of receiving and selecting geolocation data for the articulated antenna device.

While some examples only require receiving the geolocation data from either the GNSS receiver 56 or the management network 24, FIG. 10 illustrates an exemplary flow chart for an optional method of receiving and selecting the geolocation data. Initially, in step 1000 the antenna alignment management computing device 22 determines if GNSS data is available for the geolocation of the articulated antenna device 12. In either case, the antenna alignment management computing device 22 can obtain the geolocation data from the management network 24.

If, in step 1000, no GNSS data is available, the NO branch is taken to step 1002 and the geolocation data is obtained from the management network 24 and utilized in the alignment method as shown in step 1006. However, if in step 1000, GNSS is available, the YES branch is taken to step 1004. In step 1004, the alignment management computing device 22 compares the GNSS geolocation data to the geolocation data obtained from the management network 24 in step 1002 to determine if they agree. If, in step 1004, the geolocation data sets agree, the YES branch is taken to step 1006 and the geolocation data is obtained and the method proceeds. If, in step 1004, the geolocation data sets do not agree, the NO branch is taken to step 1008. In step 1008, the antenna alignment management computing device 22 can be programmed to give priority to either the GNSS geolocation data set or the geolocation data set obtained from the management network 24 and the method proceeds in step 1006 using the selected location data.

Referring again to FIGS. 9A and 9B, in step 906, the alignment management computing device 22 also receives orientation data for the articulated antenna device 12 from the frame IMUs 18(1)-18(n), including accelerometer ($F_a$), gyroscope ($F_g$), and magnetometer ($F_m$) data related to the frame. The antenna alignment management computing device 22 can also obtain orientation data from the gimbal IMUs 16(1)-16(n), including accelerometer ($G_a$), gyroscope ($G_g$), and magnetometer ($G_m$) data for the gimbal 60. In another example, the orientation data can be obtained based on one or more TOF sensors associated with the articulated antenna device 12. The orientation data can be used to determine an initial bearing angle and tilt angle for the frame 58 of the articulated antenna device 12. As described above with respect to FIGS. 6A and 6B, the bearing and tilt angle are dependent on the polarization of the antenna 34 as installed.

Figure 11:
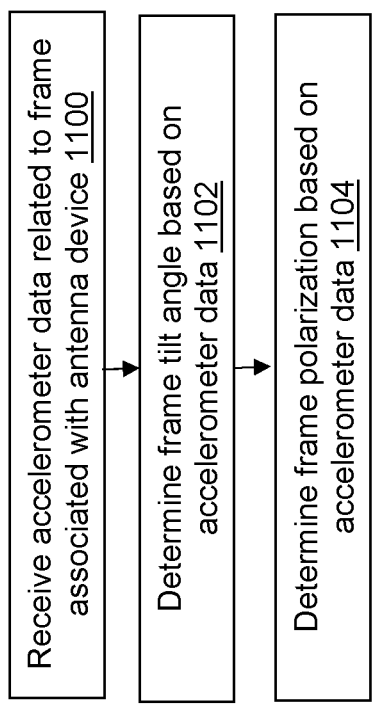
FIG. 11 illustrates an exemplary flowchart for determining the polarization of the antenna of the articulated antenna device.

FIG. 11 illustrates an exemplary flowchart for determining the polarization of the antenna. In step 1100, the antenna alignment management computing device 22 receives accelerometer data from the frame IMUs 18(1)-18(n). The accelerometer data includes x, y, z data for the frame 58 that is used in step 1102 to determine the roll angle of the frame 58. In step 1104, the antenna alignment management computing device 22 then determines the polarization based on the determined roll angle of the frame 58. As shown in FIGS. 6A and 6B, the frame 58 can be oriented in either a vertical or a horizontal polarization, which will determine the adjustment of the bearing and tilt angle for the antenna 34.

Figure 12:
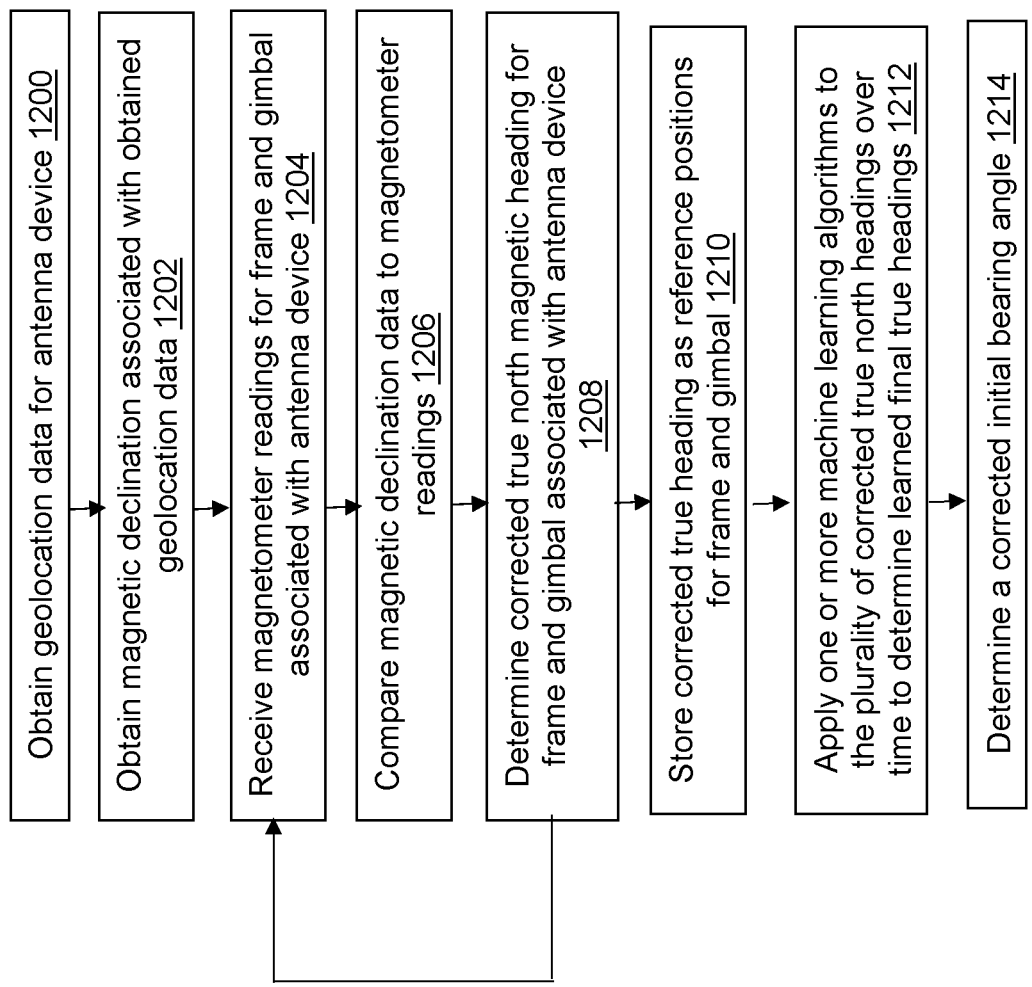
FIG. 12 illustrates an exemplary flowchart of a method of correcting magnetic declination.

FIG. 12 illustrates an exemplary flowchart of a method of correcting the magnetic declination obtained from the magnetometer data from the frame IMUs 18(1)-18(n) ($F_m$) and the gimbal IMUs 16(1)-16(n) ($G_m$). Initially, in step 1200, the antenna alignment management computing device 22 obtains the geolocation data for the articulated antenna device 12 ($F_{LAT}$, $F_{LON}$, $F_{EL}$). In step 1202, the geolocation data is utilized to obtain the true declination for that geolocation from the World Magnetic Model, which can be obtained from the management network 24.

Next, in step 1204, the alignment management computing device 22 obtains the magnetometer readings from the frame IMUs 18(1)-18(n) ($F_m$) and the gimbal IMUs 16(1)-16(n) ($G_m$). In step 1206, the magnetometer readings are compared to the true declination for the geolocation of the articulated antenna device 12.

In step 1208, the alignment management computing device 22 then determines a corrected true north heading for the frame ($F_{ch}$) and gimbal ($G_{ch}$) associated with the articulated antenna device. The corrected true north headings can be utilized to correct the initial bearing angle calculated above based on the orientation data. The process can be repeated by returning to step 1204 as additional magnetometer readings are received from the frame and gimbal IMUs 16(1)-16(n).

Next, in step 1210, the corrected true north headings are stored, for example, in the memory 66 of the alignment management computing device 22. The memory 66 can store a plurality of corrected true north headings as reference positions for the frame 58 and gimbal 60 of the articulated antenna device 12.

Optionally, in step 1212 the AI module 72 can apply one or more machine learning algorithms to the plurality of corrected true north headings over time to determine a learned final true heading for the frame ($F_h$) and the gimbal ($G_h$). In step 1214, the learned final true headings can be used to determine a corrected initial bearing angle for the articulated antenna device 12. The learned final true headings eliminate error in magnetometer readings from the frame IMUs 18(1)-18(n) and the gimbal IMUs 16(1)-16(n) and allow for a more efficient alignment process.

Referring again to FIGS. 9A and 9B, in step 908, the antenna alignment management computing device 22 receives geolocation data for the peer antenna terminal 14. In one example, the geolocation data associated with the frame of the peer antenna terminal 14 comprises a latitude ($PF_{LAT}$), longitude ($PF_{LON}$), and elevation ($PF_{EL}$) for the peer antenna terminal 14. The geolocation data for the peer antenna terminal 14 can be received either from the management network 24 or directly from the peer antenna terminal 14 through the full duplex backchannel of the transceiver device 38 of the articulated antenna device.

Next, in step 910, the antenna alignment management computing device 22 determines a static vector for aligning the articulated antenna device 12 to the peer terminal based on the geolocation data for the frame 58 of the antenna device ($F_{LAT}$, $F_{LON}$, $F_{EL}$), the first orientation data received from the frame IMUs 18(1)-18(n) and gimbal IMUs 16(1)-16(n), and the geolocation data for the peer antenna terminal 14 ($FP_{LAT}$, $FP_{LON}$, $FP_{EL}$). The static vector provides a bearing angle ($\theta_{compass}$), a tilt angle ($\beta_{tilt}$), and a distance (d) for the articulated antenna device 12 to be aligned to the peer antenna terminal 14 (shown in FIG. 1). The antenna alignment management computing device 22 may convert latitude/longitude values for the geolocation of the articulated antenna device 12 and the peer antenna terminal 14 into radians from degrees.

Figure 13:
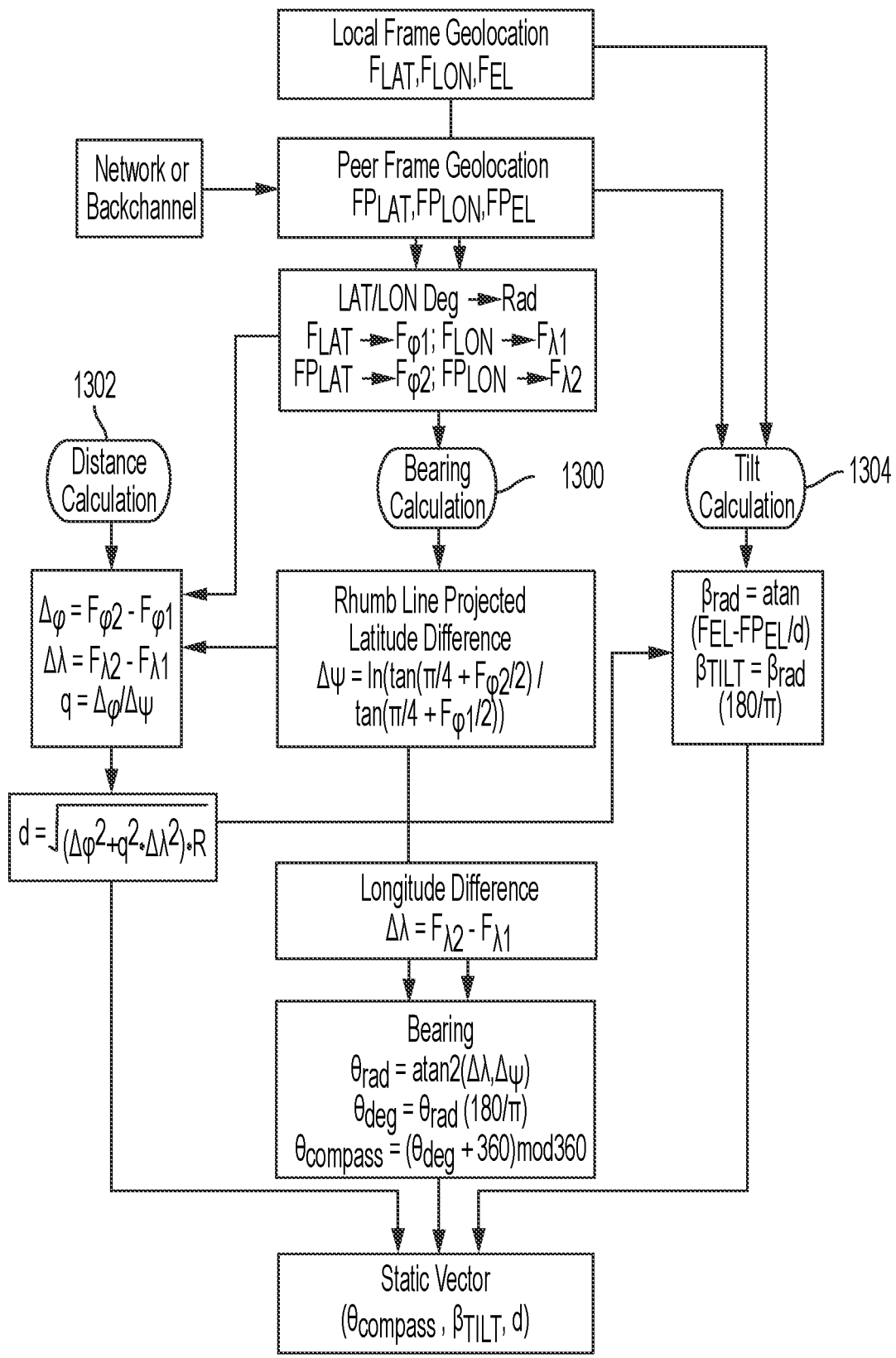
FIG. 13 illustrates an exemplary flowchart for determining a static vector in accordance with the alignment method of this disclosure.

FIG. 13 illustrates an exemplary flow chart for calculating the static vector. Although an exemplary method is disclosed, other methods could be employed to calculate the static vector. In this example, in process steps 1300, the bearing angle is calculated using a rhumb line as disclosed at https://www.movable-type.co.uk/scripts/latlong.html, the disclosures of which are incorporated by reference herein in their entirety. The rhumb line approach provides an accurate approximation in view of the relatively short distances over which the link devices operate. First, the difference in projected latitude ($\Delta_\psi$) is calculated using the following equation for the rhumb line approach:

$$\Delta_\psi = ln(tan(\pi/4 + F\varphi_2/2)/tan(\pi/4 + F\varphi_1/2)) \quad (1)$$

where $F\varphi_2$ is the latitude of the peer antenna terminal 14 frame in radians and $F\varphi_1$ is the latitude of the articulated antenna device 12 in radians. Next, the difference in longitude ($\Delta\lambda$) between the articulated antenna device 12 and the peer antenna terminal 14 is calculated using the following equation:

$$\Delta\lambda = F_{\lambda 2} - F_{\lambda 1} \quad (2)$$

where $F\lambda_2$ is the longitude of the peer antenna terminal 14 frame in radians and $F\lambda_1$ is the longitude of the articulated antenna device 12 in radians.

Next, the bearing angle is calculated based on the difference in latitude ($\Delta_\psi$) and the difference in longitude ($\Delta\lambda$) using the following equation:

$$\theta_{rad} = atan2(\Delta\lambda, \Delta_\psi) \quad (3)$$

The bearing angle is obtained in radians and can be converted to degrees by multiplying by $180/\pi$. The bearing angle is then normalized for the Earth's compass heading to obtain the bearing angle ($\theta_{compass}$) utilized in the static vector based on the following equation:

$$\theta_{compass} = (\theta_{deg} + 360) \bmod 360 \quad (4)$$

In process steps 1302, the alignment management computing device 22 determines the distance between the articulated antenna device 12 and the peer antenna terminal 14. The distance calculation relies on the difference in longitude ($\Delta\lambda$) as calculated in Equation 2. The distance calculation also utilizes the difference in latitude ($\Delta\varphi$) between the articulated antenna device 12 and the peer antenna terminal 14 as determined using the following equation:

$$\Delta\varphi = F\varphi_2 - F\varphi_{1\,m} \quad (5)$$

where $F\varphi_2$ is the latitude of the peer antenna terminal 14 frame in radians and $F\varphi_1$ is the latitude of the articulated antenna device 12 in radians. The alignment management computing device 22 also determines a value for q using the following equation:

$$q = \Delta\varphi / \Delta_\psi \quad (6)$$

where $\Delta\varphi$ is the difference in latitude and $\Delta_\psi$ is the projected difference in latitude using the rhumb line approach as calculated using Equation 1.

The distance value for the static vector is then calculated using the following equation:

$$d = \sqrt{(\Delta\varphi^2 + q^2 \cdot \Delta\lambda^2)} \cdot R \quad (7)$$

where R is the Earth's radius.

In process steps 1304, the alignment management computing device 22 calculates the tilt angle ($\beta_{tilt}$) for the static vector. The tilt angle is calculated using the elevation values for the articulated antenna device 12 ($F_{EL}$) and the peer antenna terminal 14 ($FP_{EL}$) and the distance value determined using Equation 7 in the following equation:

$$\beta_{rad} = atan(F_{EL}FP_{EL}/d) \quad (8)$$

The tilt angle is calculated in Equation 8 in radians and can be converted to degrees by multiplying by $180/\pi$ to obtain the static vector value for the tilt angle ($\beta_{tilt}$). Accordingly, the static vector provides the bearing angle ($\theta_{compass}$), the tilt angle ($\beta_{tilt}$), and the distance (d) for the articulated antenna device 12 to be aligned to the peer antenna terminal 14.

Referring again to FIGS. 9A and 9B, in step 912, the antenna alignment management computing device 22 provides a first set of instructions for adjusting the position of the articulated antenna device 12 based on the static vector to align the antenna of the articulated antenna device 12 to the peer antenna terminal 14. The first set of instructions activate the pair of motors 20(1) and 20(2) to move the gimbal 60 coupled to the antenna 34. The pair of motors 20(1) and 20(2) are configured to move the gimbal 60 to adjust the tilt and the bearing of the antenna 34, which are dependent on the polarization of the antenna 34 as described with respect to FIGS. 6A and 6B. In one example, the alignment management computing device 22 compares the initial bearing angle and tilt angle of the antenna 34, which are determined using data from the frame IMUs 18(1)-18(n) and the gimbal IMUs 16(1)-16(n) or TOF sensors 61, to the bearing angle ($\theta_{compass}$) and the tilt angle ($\beta_{tilt}$) of the static vector. The antenna alignment management computing device 22 provides instructions to the pair of motors 20(1) and 20(2) to align the bearing angle and the tilt angle to the static vector. The static vector is then stored, for example, in the memory 66 of the antenna alignment management computing device 22. The stored static vector can be utilized for dynamic adjustment of the alignment between the articulated antenna device 12 and the peer antenna terminal 14 as described below.

Once the antenna 34 of the articulated antenna device 12 is aligned to the peer antenna terminal 14 based on the static vector, the alignment between the articulated antenna device 12 and the peer antenna terminal 14 can be fine-tuned using both received signal strength indicator (RSSI) values and signal-to-noise (SNR) values based on communications between the articulated antenna device 12 and the peer antenna terminal 14. In this example, the RSSI values are used to provide a coarse adjustment to the alignment, while the SNR values are utilized to fine tune the alignment between the devices. The RSSI values and SNR values can be obtained using one or more API calls to the modem of either the articulated antenna device 12 or the peer antenna terminal 14.

In step 914, the antenna alignment management computing device 22 obtains the RSSI data and the SNR data for the antenna device. In this example, the RSSI data and SNR data is obtained based on an API call to the full duplex modem 42 of the articulated antenna device 12. The antenna alignment management computing device 22 provides instructions to the pair of motors 20(1) and 20(2) to adjust the gimbal 60 using a dithering routine in order to maximize the value for the RSSI data. The pair of motors 20(1) and 20(2) adjust both the bearing angle and the tilt angle of the antenna 34 to obtain the maximum RSSI data value. The antenna alignment management computing device 22 provides additional instructions to the pair of motors 20(1) and 20(2) to adjust the gimbal 60 in a dithering routine to maximize the SNR data value.

In step 916, the alignment management computing device 22 determines if the SNR is at a maximum value. If, in step 916, the alignment management computing device 22 determines that the SNR is not at a maximum, the NO branch is taken back to step 912. If, in step 916, the alignment management computing device 22 determines that the SNR is at a maximum, the YES branch is taken step 918.

In some examples, the alignment of the antenna may provide both a maximum for the RSSI data value and the SNR value. However, the maximum SNR value controls and the antenna alignment management computing device 22 will provide instructions to obtain the maximum SNR data even if it degrades the RSSI value. In one example, the RSSI values and SNR values are measured simultaneously during a dithering routine to provide a faster alignment between the articulated antenna device 12 and the peer terminal.

In step 918, when the SNR value is maximized, the alignment between the articulated antenna device 12 is complete and the bearing angle and tilt angle of the antenna are stored in step 920 as a reference vector, for example, in the memory 66 of the alignment management computing device 22.

The antenna alignment management computing device 22 can also perform a comparison between the static vector based on the geolocation data for the articulated antenna device 12 and the peer antenna terminal 14 and the reference vector obtained as a result of the process to maximize the SNR value as described above.

In one example, the antenna alignment management computing device 22 uses the adjusted position of the reference vector to determine the offsets in the bearing and tilt angle of the antenna 34 as compared to the static vector. The offsets from the static vector can be determined based on data from the gimbal IMUs 16(1)-16(n) or one or more TOF sensors 61 to determine the movement of the gimbal 60 necessary to maximize the SNR value. In another example, the offsets can be determined based on the instructions provided to the pair of motors 20(1) and 20(2) by the antenna alignment management computing device 22 in order to obtain the position of the antenna 34 that maximizes the SNR value.

Next, in step 922, the antenna alignment management computing device 22 stores the determined offset from the static vector over a period of time. In step 924, the plurality of stored offsets can then be used by a machine learning tool, such as the AI module 72 stored in the memory 66 of the alignment management computing device 22, to determine learned values for the offsets necessary to provide corrections to the antenna position to maximize the SNR value. These offsets can be utilized to improve the speed of the alignment process as the alignment management computing device 22 can employ them in the dithering routine to improve the efficiency in obtaining the maximum RSSI and SNR values. Further, the learned values of the offsets may be employed to overcome the errors inherent in either the gimbal IMU devices 16(1)-16(n) or frame IMU devices 18(1)-18(n) or the TOF sensors 61 utilized to measure position of the frame 58 and gimbal 60 of the articulated antenna device 12.

The technology of this disclosure can also be used to improve the alignment between the articulated antenna device 12 and the peer antenna terminal 14 by providing automated compensation for dynamic movement of either the articulated antenna device 12 or the peer antenna terminal 14. For example, the articulated antenna device 12 may be mounted on a pole that can have sway or on a building roof that may sag over time. Although examples are provided, it is to be understood that the compensation techniques described herein could be employed to adjust for any movement of either the articulated antenna device 12 or the peer antenna terminal 14 that results in a degradation in the communication signal between the two devices.

Figure 14:
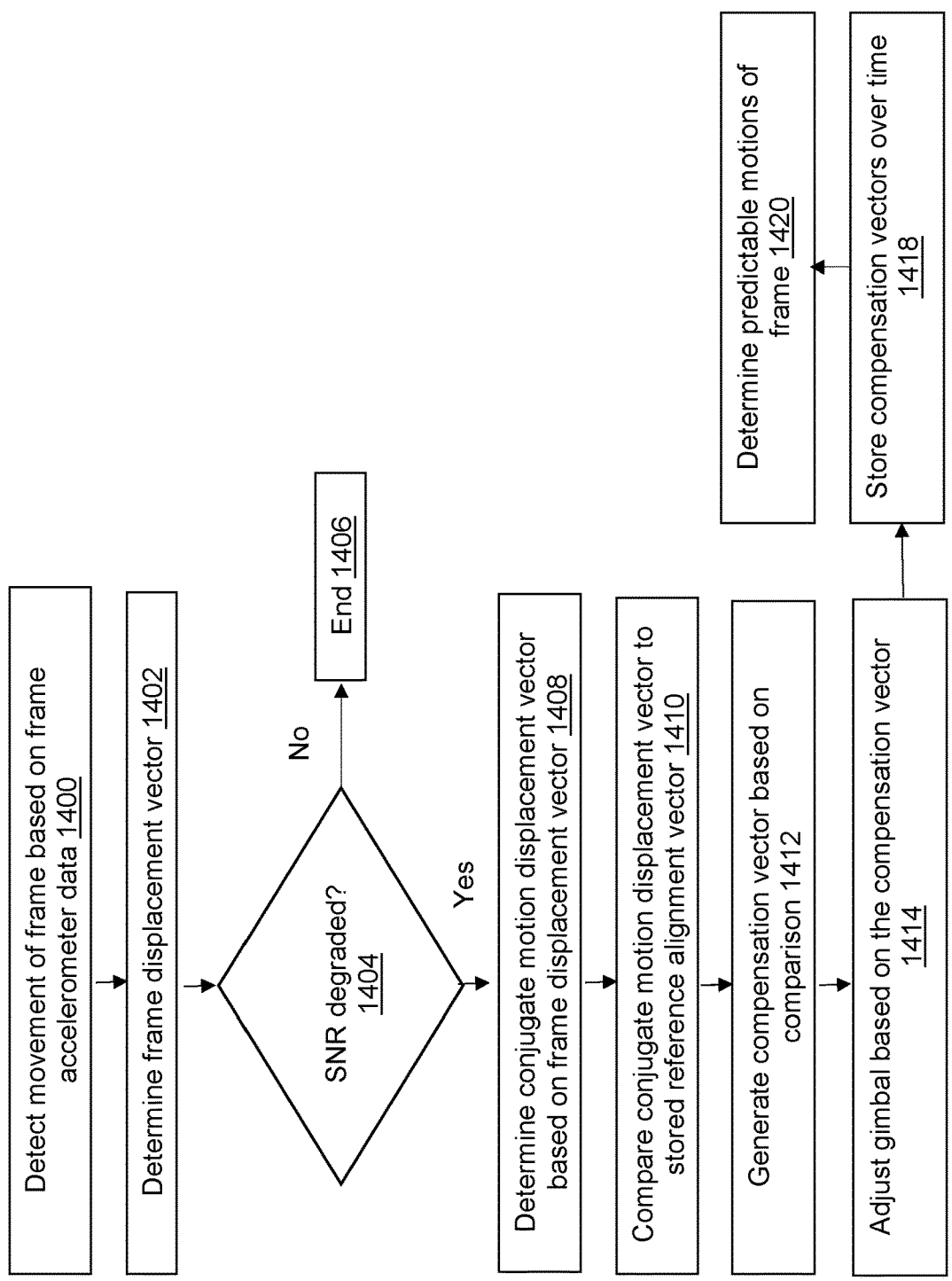
FIG. 14 illustrates a flowchart for an exemplary method of providing compensation to maintain alignment between the articulated antenna device and the peer antenna terminal in the event of frame displacement.

FIG. 14 illustrates an exemplary compensation technique using the articulated antenna device 12 of this disclosure. The compensation technique provides for compensation based on movement of the frame 58 of the articulated antenna device 12. However, the compensation technique can also compensate for movement of the peer antenna terminal 14 based on measuring the SNR signal over time.

In step 1400, the antenna alignment management computing device 22 detects movement of the frame of the articulated antenna device 12 based on data from the frame IMUs 18(1)-18(n), such as accelerometer and/or gyroscope data. As discussed above, the frame 58 of the articulated antenna 12 is mounted on a structure such as a pole or a building that are presumed stationary, but can have movement over time either due to inclement weather or simply due to the passage of time.

Next, in step 1402, the antenna alignment management computing device 22 determines a frame displacement vector based on the detected movement. For example, the frame IMUs 18(1)-18(n) can include a three-axis accelerometer and a three-axis gyroscope configured to determine movement of the frame 58 in three axes. The displacement vector is based on the data received from the frame IMUs 18(1)-18(n).

In step 1404, the antenna alignment management computing device 22 then determines whether the SNR value for communications between the articulated antenna device 12 and the peer antenna terminal 14 has been degraded. In other examples, the SNR may be constantly monitored such that a detected movement is not required to start the compensation process. For example, the SNR may be obtained based on API calls to the modem 42 of the articulated antenna device 12. Some movements of the frame 58 will not result in any degradation to the SNR value. In those cases, in step 1404, the NO branch is taken to step 1406 where no compensation is required and the method ends.

If in step 1404, the antenna alignment management computing device 22 determines that the SNR value has been degraded, the YES branch is taken to step 1408. In step 1408, the alignment management computing device 22 determines a conjugate motion vector based on the frame displacement vector determined from the data from the frame IMUS 18(1)-18(n). The conjugate motion vector is the frame displacement vector with the translation and rotation directions reversed.

Next, in step 1410, the conjugate motion vector is compared to the reference vector stored, for example, in the memory 66 of the antenna alignment management computing device 22. As described above, the stored reference vector indicates the bearing angle and the tilt angle for the antenna 34 used to maximize the SNR value.

The antenna alignment management computing device 22 then in step 1412 determines a compensation vector based on the comparison of the conjugate motion vector to the stored reference vector. In step 1414, the alignment management computing device 22 then provides instructions to the pair of motors 20(1) and 20(2) to adjust the gimbal 60 in accordance with the compensation vector in order to compensate for the motion of the frame 58 to maintain alignment between the articulated antenna device 12 and the peer antenna terminal 14.

In step 1418, the antenna alignment management computing device 22 stores the generated compensation vectors over time. The compensation vectors can be applied in a machine learning algorithm, such as the AI module 72, in step 1420, to determine certain predictable motions of the frame 58 and necessary compensations. For example, the machine learning may employ data from other sources, such as the management network 24, to learn predictable motions. In one example, the antenna alignment management computing device 22 may acquire weather data from the management network 24. The wind or temperature data may be used to predict certain compensation vectors that will need to be employed in order to provide more efficient compensation for the alignment between the articulated antenna device 12 and the peer antenna terminal 14.

Accordingly, the technology of this disclosure provides a number of advantages including providing an articulated antenna device 12 and methods of alignment and compensation thereof that allow for simpler installation of peer-to-peer antenna devices as well as improved alignment compensation in response to external forces. Additionally, the technology employs a number of machine learning techniques that allow for more efficient alignment and compensation based on acquired data over time.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed:

1. A method for aligning an antenna device to a peer antenna device, the method comprising:

receiving, by an antenna alignment management computing device, first geolocation data and first orientation data for the antenna device;

receiving, by the antenna alignment management computing device, second geolocation data for the peer antenna device;

determining, by the antenna alignment management computing device, a static vector for aligning the antenna device to the peer antenna device based on the first geolocation data, the first orientation data, and the second geolocation data;

providing, by the antenna alignment management computing device, a first set of instructions for adjusting the position of the antenna device based on the static vector to align the antenna device to the peer antenna device;

obtaining, by the antenna alignment management computing device, received signal strength indicator (RSSI) data and signal-to-noise (SNR) data for the antenna device based on communications with the peer antenna device;

providing, by the antenna alignment management computing device, a second set of instructions for adjusting the position of the antenna device to obtain a maximum value for the RSSI data;

providing, by the antenna alignment management computing device, a third set of instructions for adjusting the position of the antenna device to obtain a maximum value for the SNR data; and determining, by the antenna alignment management computing device, one or more offsets from the static vector based on the adjusted position of the antenna device to obtain the maximum value for the SNR data.

2. The method of claim 1, wherein the first set of instructions to adjust the position of the antenna device comprise instructions to activate one or more motors to move a gimbal associated with the antenna device to adjust a tilt and a bearing of the antenna device, wherein the antenna device comprises an antenna coupled to a transceiver device by a flexible waveguide.

3. The method of claim 1, wherein determining the static vector for aligning the antenna device to the peer antenna device further comprises:

determining, by the antenna alignment management computing device, a distance between the antenna device and the peer antenna device based on the first geolocation data and the second geolocation data;

determining, by the antenna alignment computing device, a bearing angle between the antenna device and the peer antenna device based on the first geolocation data and the second geolocation data; and calculating, by the antenna alignment management computing device, a tilt angle between the antenna device and the peer antenna device, based on the first geolocation data, the second geolocation data, and the determined distance between the antenna device and the peer antenna device.

4. The method of claim 1 further comprising:

storing, by the antenna alignment management computing device, a plurality of the one or more offsets from the static vector over time; and applying, by the antenna alignment management computing device, a machine learning algorithm to the plurality of the one or more offsets to the static vector to determine learned values for the one or more offsets in the first orientation data.

5. The method of claim 1, wherein the first set of orientation data comprises a first bearing angle and a first tilt angle for the antenna device, the method further comprising:

applying, by the antenna alignment management computing device, a magnetic declination correction factor to the first bearing angle to provide a corrected first bearing angle;

storing, by the antenna alignment management computing device, a plurality of the corrected first bearing angles for the antenna device over time; and applying, by the antenna alignment management computing device, a machine learning algorithm to the plurality of corrected first bearing angles to determine a learned corrected first bearing angle for the antenna device.

6. The method of claim 1 further comprising:

receiving, by the antenna alignment management computing device, data related to movement of the antenna device based on data from one or more inertial measurement units associated with a frame of the antenna device;

determining, by the antenna alignment management computing device, a frame displacement vector based on the received movement data;

determining, by the antenna alignment management computing device, whether a signal-to-noise (SNR) data value is decreased based on the movement of the antenna device;

generating, by the antenna alignment computing device, a compensation vector for adjusting the antenna device based on the movement of the antenna device when the SNR data value is decreased, wherein the generating the compensation vector comprises:

comparing, by the antenna alignment management computing device, the frame displacement vector to the static vector; and generating, by the antenna alignment management computing device, the compensation vector based on the comparison; and providing, by the antenna alignment computing device, a fourth set of instructions for adjusting the position of the antenna device based on the compensation vector.

7. The method of claim 6 further comprising:

storing, by the antenna alignment management computing device, a plurality of generated compensation vectors over time; and applying, by the antenna alignment management computing device, a machine learning algorithm to the plurality of generated compensation vectors to determine learned compensation vectors based on movement of the antenna device.

8. A non-transitory computer readable medium having program instructions configured to:

receive first geolocation data and first orientation data for an antenna device;

receive second geolocation data for a peer antenna device;

determine a static vector for aligning the antenna device to the peer antenna device based on the first geolocation data, the first orientation data, and the second geolocation data;

provide a first set of instructions for adjusting the position of the antenna device based on the static vector to align the antenna device to the peer antenna device;

obtain received signal strength indicator (RSSI) data and signal-to-noise (SNR) data for the antenna device based on communications with the peer antenna device;

provide a second set of instructions for adjusting the position of the antenna device to obtain a maximum value for the RSSI data;

provide a third set of instructions for adjusting the position of the antenna device to obtain a maximum value for the SNR data; and determine one or more offsets from the static vector based on the adjusted position of the antenna device to obtain the maximum value for the SNR data.

9. The medium of claim 8, wherein the first set of instructions to adjust the position of the antenna device comprise instructions to activate one or more motors to move a gimbal associated with the antenna device to adjust a tilt and a bearing of the antenna device, wherein the antenna device comprises an antenna coupled to a transceiver device by a flexible waveguide.

10. The medium of claim 8, wherein determining the static vector for aligning the antenna device to the peer antenna device further comprises:

determine a distance between the antenna device and the peer antenna device based on the first geolocation data and the second geolocation data;

determine a bearing angle between the antenna device and the peer antenna device based on the first geolocation data and the second geolocation data; and calculate a tilt angle between the antenna device and the peer antenna device, based on the first geolocation data, the second geolocation data, and the determined distance between the antenna device and the peer antenna device.

11. The medium of claim 8 further comprising the program instructions configured to:

store a plurality of the one or more offsets from the static vector over time; and apply a machine learning algorithm to the plurality of the one or more offsets to the static vector to determine learned values for the one or more offsets in the first orientation data.

12. The medium of claim 8, wherein the first set of orientation data comprises a first bearing angle and a first tilt angle for the antenna device, the medium further comprising the program instructions configured to:

apply a magnetic declination correction factor to the first bearing angle to provide a corrected first bearing angle;

store a plurality of the corrected first bearing angles for the antenna device over time; and apply a machine learning algorithm to the plurality of corrected first bearing angles to determine a learned corrected first bearing angle for the antenna device.

13. The medium of claim 8 further comprising the program instructions configured to:

receive data related to movement of the antenna device based on data from one or more inertial measurement units associated with a frame of the antenna device;

determine a frame displacement vector based on the received movement data;

determine whether a signal-to-noise (SNR) data value is decreased based on the movement of the antenna device;

generate a compensation vector for adjusting the antenna device based on the movement of the antenna device when the SNR data value is decreased, wherein the generating the compensation vector comprises:

compare by the alignment management computing device, the frame displacement vector to the static vector; and generate the compensation vector based on the comparison; and provide a fourth set of instructions for adjusting the position of the antenna device based on the compensation vector.

14. The medium of claim 13 further comprising the program instructions configured to:

store a plurality of generated compensation vectors over time; and apply a machine learning algorithm to the plurality of generated compensation vectors to determine learned compensation vectors based on movement of the antenna device.

15. An alignment management computing device, comprising a memory comprising program instructions stored thereon and one or more processors configured to execute the stored program instructions to:

receive first geolocation data and first orientation data for an antenna device;

receive second geolocation data for a peer antenna device;

determine a static vector for aligning the antenna device to the peer antenna device based on the first geolocation data, the first orientation data, and the second geolocation data;

provide a first set of instructions for adjusting the position of the antenna device based on the static vector to align the antenna device to the peer antenna device obtain received signal strength indicator (RSSI) data and signal-to-noise (SNR) data for the antenna device based on communications with the peer antenna device;

provide a second set of instructions for adjusting the position of the antenna device to obtain a maximum value for the RSSI data;

provide a third set of instructions for adjusting the position of the antenna device to obtain a maximum value for the SNR data; and determine one or more offsets from the static vector based on the adjusted position of the antenna device to obtain the maximum value for the SNR data.

16. The device of claim 15, wherein the first set of instructions to adjust the position of the antenna device comprise instructions to activate one or more motors to move a gimbal associated with the antenna device to adjust a tilt and a bearing of the antenna device, wherein the antenna device comprises an antenna coupled to a transceiver device by a flexible waveguide.

17. The device of claim 15, wherein the memory includes further program instructions executable by the processor to:

determine a distance between the antenna device and the peer antenna device based on the first geolocation data and the second geolocation data;

determine a bearing angle between the antenna device and the peer antenna device based on the first geolocation data and the second geolocation data; and calculate a tilt angle between the antenna device and the peer antenna device, based on the first geolocation data, the second geolocation data, and the determined distance between the antenna device and the peer antenna device.

18. The device of claim 15, wherein the memory includes further program instructions executable by the processor to:

store a plurality of the one or more offsets from the static vector over time; and apply a machine learning algorithm to the plurality of the one or more offsets to the static vector to determine learned values for the one or more offsets in the first orientation data.

19. The device of claim 15, wherein the first set of orientation data comprises a first bearing angle and a first tilt angle for the antenna device, wherein the memory includes further program instructions executable by the processor to:

apply a magnetic declination correction factor to the first bearing angle to provide a corrected first bearing angle;

store a plurality of the corrected first bearing angles for the antenna device over time; and apply a machine learning algorithm to the plurality of corrected first bearing angles to determine a learned corrected first bearing angle for the antenna device.

20. The device of claim 15, wherein the memory includes further program instructions executable by the processor to:

receive data related to movement of the antenna device based on data from one or more inertial measurement units associated with a frame of the antenna device;

determine a frame displacement vector based on the received movement data;

determine whether a signal-to-noise (SNR) data value is decreased based on the movement of the antenna device;

generate a compensation vector for adjusting the antenna device based on the movement of the antenna device when the SNR data value is decreased, wherein the generating the compensation vector comprises:

compare by the alignment management computing device, the frame displacement vector to the static vector; and generate the compensation vector based on the comparison; and provide a fourth set of instructions for adjusting the position of the antenna device based on the compensation vector.

21. The device of claim 20, wherein the memory includes further program instructions executable by the processor to:

store a plurality of generated compensation vectors over time; and apply a machine learning algorithm to the plurality of generated compensation vectors to determine learned compensation vectors based on movement of the antenna device.

* * * * *